(12) United States Patent
Dawson-Haney et al.

(10) Patent No.: US 9,451,444 B2
(45) Date of Patent: Sep. 20, 2016

(54) SYSTEMS AND METHODS FOR PROVIDING MODEM BEHAVIOR-BASED SETUP FOR USER DEVICES

(71) Applicant: Cellco Partnership, Arlington, VA (US)

(72) Inventors: Maxine C. Dawson-Haney, Somerset, NJ (US); Zhengfang Chen, Millburn, NJ (US); Andrew E. Youtz, Princeton, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 14/285,066

(22) Filed: May 22, 2014

(65) Prior Publication Data

US 2015/0341779 A1    Nov. 26, 2015

(51) Int. Cl.
*H04W 8/18* (2009.01)
*H04B 1/3816* (2015.01)

(52) U.S. Cl.
CPC ........... *H04W 8/183* (2013.01); *H04B 1/3816* (2013.01); *H04W 8/18* (2013.01)

(58) Field of Classification Search
CPC ...... H04W 8/26; H04W 8/265; H04W 4/003
USPC .......... 455/410, 411, 414.1–414.3, 418, 419; 726/6, 7
See application file for complete search history.

(56) References Cited

U.S. PATENT DOCUMENTS

| | | | |
|---|---|---|---|
| 8,838,087 B1* | 9/2014 | Delker | H04M 1/72525 455/419 |
| 2006/0183500 A1* | 8/2006 | Choi | H04W 8/265 455/558 |
| 2009/0138948 A1* | 5/2009 | Calamera | H04L 9/3234 726/6 |
| 2010/0192212 A1* | 7/2010 | Raleigh | G06Q 10/06375 726/7 |
| 2014/0045474 A1* | 2/2014 | Cheuk et al. | 455/418 |
| 2015/0148020 A1* | 5/2015 | Laden | H04W 12/06 455/418 |

* cited by examiner

*Primary Examiner* — Kamran Afshar
*Assistant Examiner* — Nicole Louis-Fils

(57) ABSTRACT

Systems and methods are described for enabling a mobile device to connect with a data network, based on the type of account associated with the mobile device. The system transmits a first signal to the data network and receives one or more network codes in response. The network codes may correspond to a type of SIM card associated with the mobile device. The system may display one or more setup screens on the mobile device based on the received network codes. The setup screens may guide the user of the mobile device to access the data network using an existing account, or setup a new account to access the data network.

20 Claims, 19 Drawing Sheets

100

300

SW14

SYSTEMS AND METHODS FOR PROVIDING MODEM BEHAVIOR-BASED SETUP FOR USER DEVICES

BACKGROUND INFORMATION

When a user purchases a new mobile device (for example, a tablet or smart phone), after the user takes the device out of box and powers it up, the device will display a series of screens. These screens will help the user to setup his device, as well as allow sufficient time for the device modem to register and connect to the wireless network. These screens are called the Setup Wizard.

The current design of Setup Wizard is based on the assumption that the mobile device has a valid paid account provisioned on the service provider's wireless data network; the Setup Wizard also assumes the device modem will complete wireless network registration and account activation within certain a time before the user is prompted to login or setup his email account during Setup Wizard. Thus the screen display duration for each screen in the Setup Wizard is timer based.

With the rapid growth of smart phone and tablet market, more and more customers are able to purchase a mobile device without a pre-provisioned account, or with only month-to-month prepay account. When powering up such a device, the current Setup Wizard design is not able to deliver an accurate message on the device subscription status to the customer, the customer will get an error message about account activation failure, and the only option for the customer is to power off the device, call the service provider's customer service number, or walk to the service provider's retail store to sign up a data plan in order to use this mobile device. This leads to a negative user experience.

These and other drawbacks exist.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

In order to address an accurate and seamless device out-of-box user experience for a mobile device with any type of account/subscription status at initial power up without the need to call customer service or walk to a retail store, the Setup Wizard disclosed herein is provided. As opposed to the existing traditional "timer-based" Setup Wizard screen displays, the embodiments disclosed determine when and which screen to be displayed by utilizing a network configuration code or error code information obtained from the device modem during power up, which accurately differentiates the mobile device account status, and guides the customer accordingly. This "modem behavior based" design may significantly enhance the user experience.

The description below describes user interface modules, code modules, network modules, hardware modules, user devices, service providers, computer systems, and networks that may include one or more modules, some of which are explicitly shown while others are not. As used herein, the term "module" may be understood to refer to computing software, firmware, hardware, and/or various combinations thereof. It is noted that the modules are examples. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Figure 1:
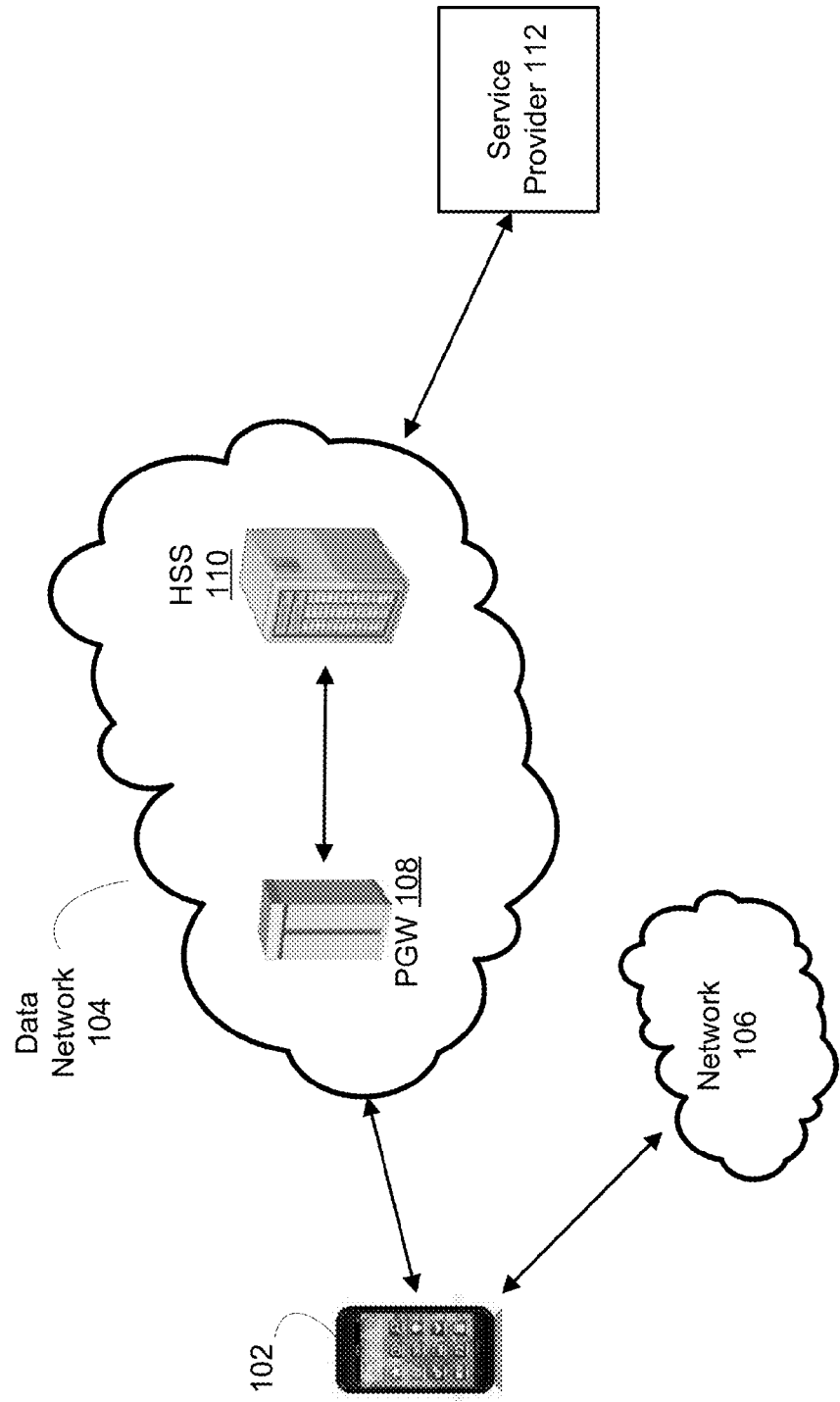
FIG. 1 is a schematic diagram illustrating a system according to a particular embodiment.

It is further noted that software described herein may be tangibly embodied in one or more physical media, such as, but not limited to, a compact disc ("CD"), a digital versatile disc ("DVD"), a floppy disk, a hard drive, read only memory ("ROM"), random access memory ("RAM"), as well as other physical media capable of storing software, and/or combinations thereof. The functions described as being performed at various components may be performed at other components, and the various components may be combined and/or separated. Other modifications also may be made FIG. 1 is a schematic diagram illustrating a system according to particular embodiments. As illustrated in FIG. 1, system 100 may include a user device 102, data network 104, network 106, and service provider 112. User device 102 may be, for example, but not limited to, a cellular telephone, Session Initiation Protocol ("SIP") phone, software client/phone, a desktop computer, a laptop/notebook, a server, a module, a satellite phone, a personal digital assistant ("PDA"), a tablet computer, a smart phone, a remote controller, a personal computer ("PC"), a workstation, a handheld PC, a handheld MP3 player, a handheld video player, a personal media player, a gaming device, a thin system, a fat system, a network appliance, and/or other mobile communication device that may be capable of transmitting and/or receiving data. Also, user device 102 may include one or more transmitters, receivers, and/or transceivers to transmit and/or receive one or more signals to and/or from other components depicted in FIG. 1, including, for example, data network 104, network 106, packet data network gateway (PGW) 108, home subscriber server (HSS) 110, and/or service provider 112.

User device 102 may include a Subscriber Identity Module (SIM) card 102a. SIM card 102a may be an integrated circuit that securely stores data that uniquely identifies user device 102 for data network 104 and service provider 112. SIM card 102a may be embedded on a removable plastic card on user device 102. SIM card 102a may include a unique serial number, a unique international mobile subscriber identity, a mobile directory number (MDN), a PIN, and other unique data. SIM card 102a may include an International Mobile Subscriber Identity (IMSI) and an International Mobile Station Equipment Identity (IMEI) which may uniquely identify user device 102. SIM card 102a may be associated with an account provisioned by HSS 110 and/or service provider 112 allowing user device 102 to access data network 104.

User device 102 may include a modem 102b. Modem 102b may be combination of hardware and software that allows user device 102 to communicate with data network 104 and network 106.

The first time user device 102 is activated, it may need to be connected to data network 104. User device 102 may include setup wizard 200. Setup wizard 200 may be a combination of hardware and/or software to guide the user of user device 102 through a series of steps to setup the device preferences after the user has powered up user device 102 for the first time. Setup wizard 200 may provide user device 102 with a series of screens, based on the type of account associated with SIM card 102a on user device 102, as will be described in detail below.

Data network 104 may be a 4G network that complies with the International Mobile Telecommunications Advanced (IMT-Advanced) specification. Data network 104 may be a Long Term Evolution (LTE) network. Data network 104 may be a LTE Advanced (LTE-A) network. Data network 104 may be a Mobile WiMAX (IEEE 802.16e). Data network 104 may be a Mobile WiMAX Release 2 (IEEE 802.16m) network. Data network 104 may comprise one or more PGW's 108 and HSS's 110. While only one instance of each of PGW 108 and HSS 110 are shown in FIG. 1, other embodiments may contain multiple instances of PGW 108 and/or HSS 110.

PGW 108 may serve as a gateway that acts as an interface between data network 104 and user device 102. Data network 104 may include multiple gateways. HSS 110 may comprise subscription related information for different user devices that are able to connect to data network 104. HSS 110 may be associated with service provider 112 (or in some embodiments may be part of service provider 112). Data network 104 may be supported by service provider 112. Data network 104 may comprise other components (e.g., servers, gateways, routers, databases) that are not depicted in FIG. 1.

Network 106 may be a wireless network, a wired network, or any combination of wireless network and wired network.

For example, network 106 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, network 106 may include, without limitation, telephone line, fiber optics, IEEE Ethernet 802.3, a wide area network ("WAN"), a local area network ("LAN"), or a global network such as the Internet. Also, network 106 may support, an Internet network, a wireless communication network, a cellular network, or the like, or any combination thereof. Networks 106 may further include one, or any number of the exemplary types of networks mentioned above operating as a stand-alone network or in cooperation with each other. Network 106 may utilize one or more protocols of one or more network elements to which it is communicatively coupled. Networks 106 may translate to or from other protocols to one or more protocols of network devices. Although network 106 is depicted as one network, it should be appreciated that according to one or more embodiments, network 106 may comprise a plurality of interconnected networks, such as, for example, a service provider network, the Internet, a broadcaster's network, a cable television network, corporate networks, and home networks.

The components depicted in FIG. 1 may transmit and receive data to and from network 106 and data network 104 representing broadcast content, user request content, parallel search queries, parallel search responses, and other data. The data may be transmitted and received utilizing a standard telecommunications protocol or a standard networking protocol. For example, one embodiment may utilize Session Initiation Protocol ("SIP"). In other embodiments, the data may be transmitted and/or received utilizing other Voice Over IP ("VOIP") or messaging protocols. For example, data may also be transmitted and/or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving broadcast or parallel search data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. Network 106 may use standard wireless protocols including IEEE 802.11a, 802.11b and 802.11g. Network 106 may also use protocols for a wired connection, such as an IEEE Ethernet 802.3.

SIM card 102a may be associated with an activated account with service provider 112. The account may allow user device 102 to access data network 104. The account may be a post-pay account or prepay account with sufficient balance. In a post-pay account, the user has an agreement with service provider 112 to pay a predetermined amount each month for access to data network 104. In a pre-pay account the user of user device 102 has previously paid for a certain amount of access to data network 104 (for example, the user may have paid for 2 GB of data on data network 104, or for one month of access to data network 104). In these two cases, SIM card 102a may be known as a "Hot SIM".

In another example, SIM card 102a may be associated with an unactivated post-pay or pre-pay account with service provider 112. In this case, SIM card 102a may be known as a "Warm SIM".

In another example, SIM card 102a may be associated with a pre-pay account that has a $0 balance, meaning that the user of user device 102 will need to pay service provider 112 before being given unrestricted access to data network 104. In this case, when user device 102 first attempts to communicate with data network 104, the device is directed to a web portal hosted by service provider 112 where the user may pay for access to data network 104. In this case, the SIM card 102a may be known as a "$0 prepay SIM."

In another example, SIM card 102a may be associated with a self-activation account. This may be known as an "SA SIM." A user device 102 having an SA SIM does not yet have an account with service provider 112 for unrestricted access to data network 104. When a user device 102 with this type of SIM first attempts to connect to data network 104, user device 102 is directed to a web portal hosted by service provider 112, where the user is directed through various steps to activate SIM card 102a and sign up for an account with service provider 112 so that user device 102 can have unrestricted access data network 104.

In another example, SIM card 102a may be associated with an unprovisioned account, meaning the SIM is not provisioned to work on data network 104. When a user device 102 with this type of SIM attempts to connect to data network 104, the network rejects the request. This type of SIM is known as a "Cold SIM". For example, a Cold SIM may be a SIM card that is not associated with an MDN.

Figure 2:
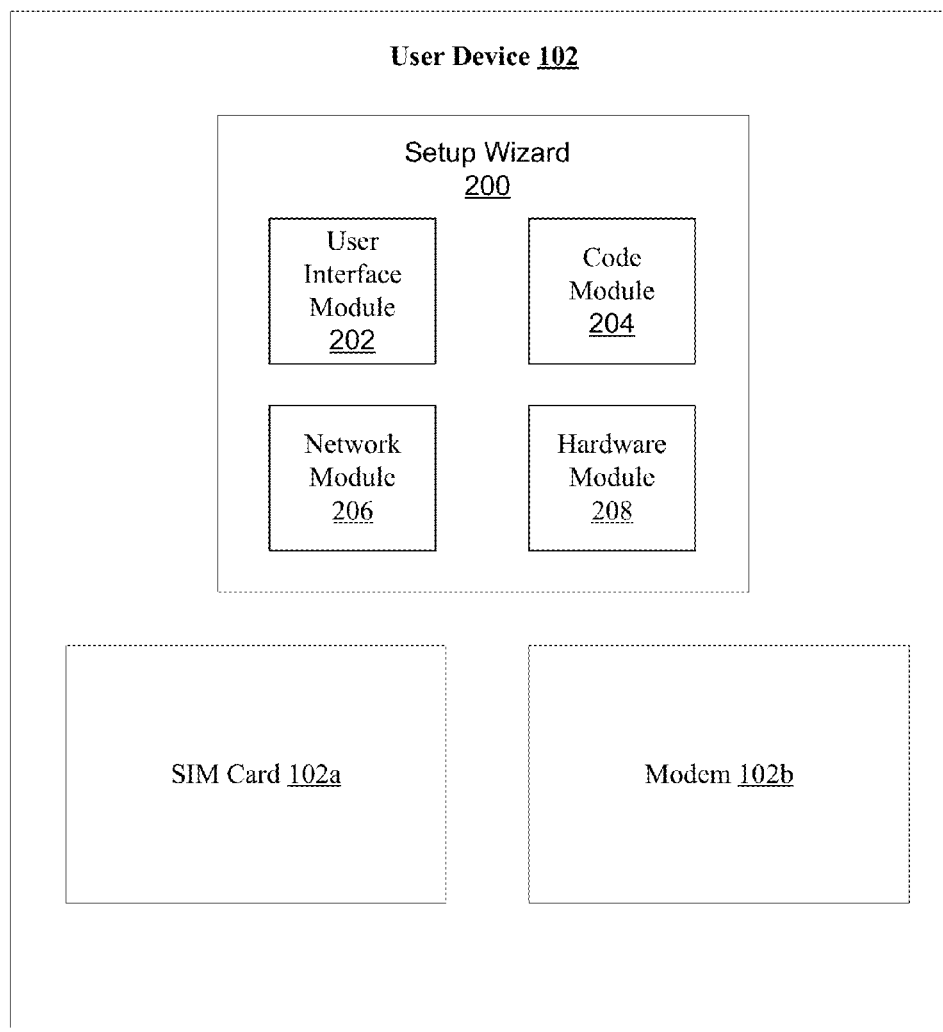
FIG. 2 is a block diagram of a hardware component of the setup system according to a particular embodiment.

Setup wizard 200 may include a user interface module 202, a code module 204, a network module 206, and a hardware module 208, as described herein in reference to FIG. 2. Setup wizard 200 may be configured to work on one or more network-enabled computers. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device.

FIG. 2 is a block diagram of a component of a setup wizard 200 according to a particular embodiment. Setup wizard 200 may be software on user device 102. Setup wizard 200 may include user interface module 202, a code module 204, a network module 206, and a hardware module 208. It is noted that the modules 202, 204, 206, and 208 are exemplary and the functions performed by one or more of the modules may be combined with that performed by other modules. The functions described herein as being performed by the modules 202, 204, 206, and 208 also may be separated and may be located or performed by other modules. Moreover, the modules 202, 204, 206, and 208 may be implemented at other devices of the system 100 (e.g., service provider 112).

User interface module 202 may provide a series of one or more setup screens (shown in FIGS. 4A-4M) when user device 102 is initially activated, based on the type of SIM card 102a. The setup screens may be provided on the display of user device 102. The setup screens may be configured to receive inputs from the user of user device 102. The user may interact with the various setup screens using manual input (e.g., typing into a keyboard or keypad, etc.), voice input, touch screen input, graphical input (e.g., camera or camcorder) and/or any other method for inputting information or data to user device 102. The functions of each screen will be described in greater detail in conjunction with FIGS. 3A-3C and 4A-4M.

Code module 204 may be configured to interact with modem 102b to attach to data network 104 when user device 102 is initially powered up. Code module 204 may cause modem 102b send an attach request and a PDN connectivity request to data network 104. The PDN connectivity request may include a request for one or more network codes from data network 104. The PDN connectivity request may include the IMSI for SIM card 102a.

PGW 108 may receive the PDN connectivity request from user device 102. PGW 108 may determine what type of account is associated with SIM card 102a by sending a request to HSS 110. HSS 110 may maintain a record for service provider 112 of IMSI's that are associated with provisioned accounts for service provider 112 and the type of account. Each IMSI may be associated with a unique account with service provider 112 that allows user device 102 to access data network 104. The account may be a post-pay account, a pre-pay account with a positive account balance, a pre-pay account with a $0 account balance, or a self-activation account. This account information maintained by HSS 110 corresponds to the type of SIM card in user device 102. If HSS 110 determines that the IMSI matches a provisioned account, HSS 110 indicates to PGW 108 what type of account is associated with SIM card 102a (e.g., a post-pay account, a pre-pay account with a positive account balance, a pre-pay account with a $0 account balance, or a self-activation account). Upon receiving this information. PGW 108 generates a network code and transmits it to modem 102b of user device 102. If HSS 110 sends a signal to PGW 108 indicating that SIM card 102a is one of a Hot SIM, Warm SIM, $0 prepay SIM, or SA SIM, the network code generated and transmitted by PGW 108 will be a Protocol Configuration Option (PCO) code, and PGW 108 will allow user device 102 to attach to network 104. If HSS 110 sends a signal to PGW 108 indicating that SIM card 102a is a Cold SIM, the network code generated and transmitted by PGW 108 will be an Evolved Packet System (EPS) Mobility Management (EMM) code and PGW 108 will reject user device 102.

Upon receiving the PCO code or EMM code, modem 102b may provide this to the code module 204. The received network code may indicate to code module 204 the type of account that is associated with SIM card 102a. User interface module 202 may display one or more setup screens on user device 102 based on the network code received by code module 204.

If SIM card 102a is a Hot SIM or a Warm SIM (i.e., associated with an account with service provider 112 that is a post-pay account or a prepay account with a positive account balance), the PCO code generated by PGW 108 and received by modem 102b may have a value of 0. In other embodiments, the PCO code associated with a Hot SIM or Warm SIM may be a different value, depending on data network 104 and/or service provider 112. If SIM card 102a is a $0 prepay SIM (i.e., associated with an account with service provider 112 that is a prepay account with a balance of $0), the PCO code generated by PGW 108 and received by modem 102b may have a value of 3. In other embodiments, the PCO code associated with a $0 prepay SIM may be a different value, depending on data network 104 and/or service provider 112. If SIM card 102a is a SA SIM (i.e., associated with a self-activation account with service provider 112), the PCO code generated by PGW 108 and received by modem 102b may have a value of 5. In other embodiments, the PCO code associated with an SA SIM may be a different value, depending on data network 104 and/or service provider 112. If SIM card 102a is a Cold SIM (i.e., HSS 110 does not recognize the IMSI of that SIM card), the EMM code received by modem 102b may have a value of 8. Based on the value of the received network code, user interface module 202 provides different setup screens on the display of user device 102. This process will be described in detail in conjunction with FIGS. 3A-3C.

Network module 206 may be configured to determine the type of network of data network 104 and network 106. For example, data network 104 may be a 4G LTE network, a 3G network, a High Rate Packet Data (HPRD) network, or an enhanced HPRD (eHPRD) network. Network module 206 may receive signals from data network 104 to make this determination. Different signals may be associated with different types of networks. These signals may be based on wireless industry standards.

Hardware module 208 may be configured to evaluate the hardware on user device 102. This will be described in greater detail in conjunction with FIGS. 3A-3C.

Figure 3A:
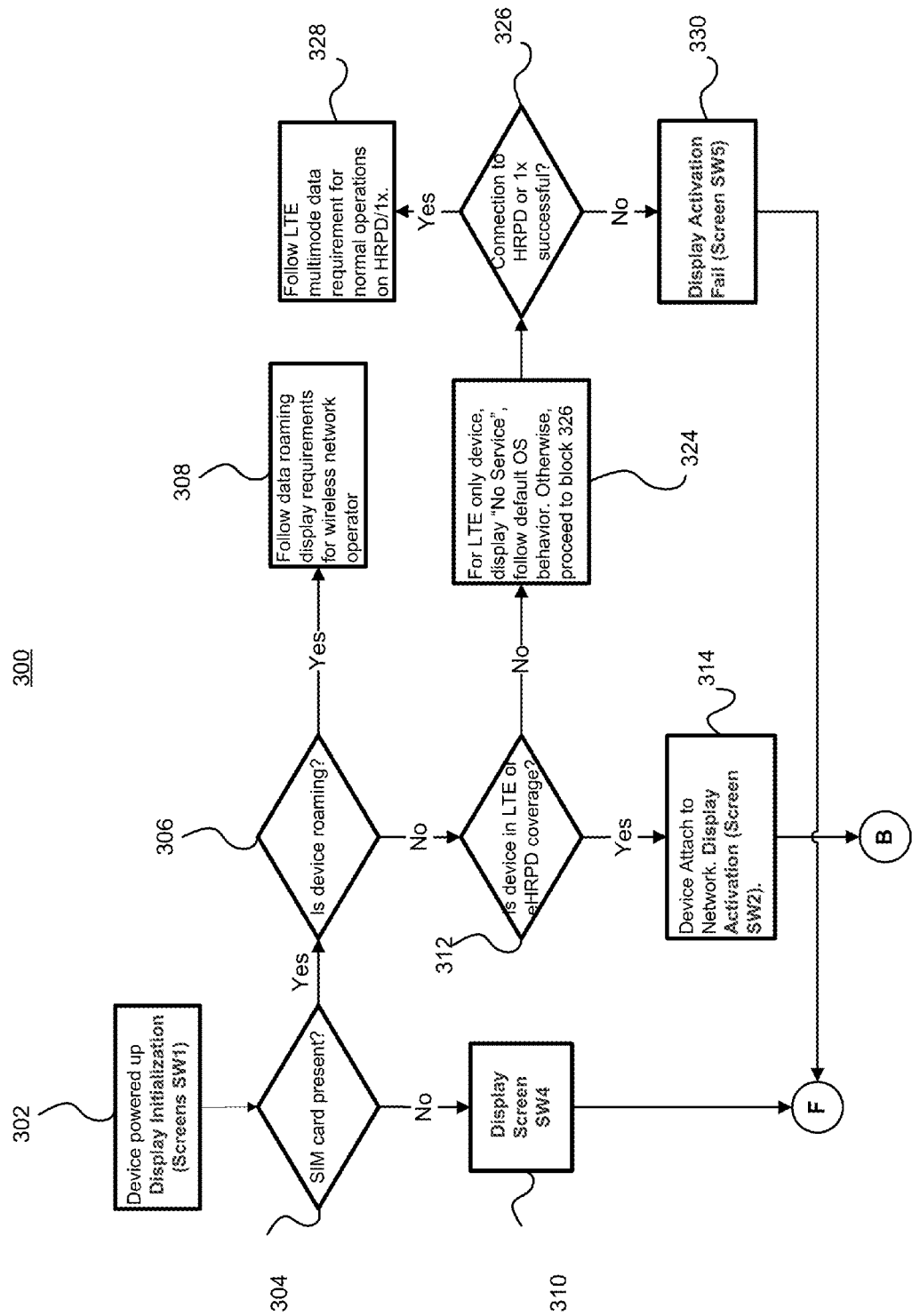
FIG. 3A is a flowchart illustrating the functionality of a method according to a particular embodiment.
Figure 3B:
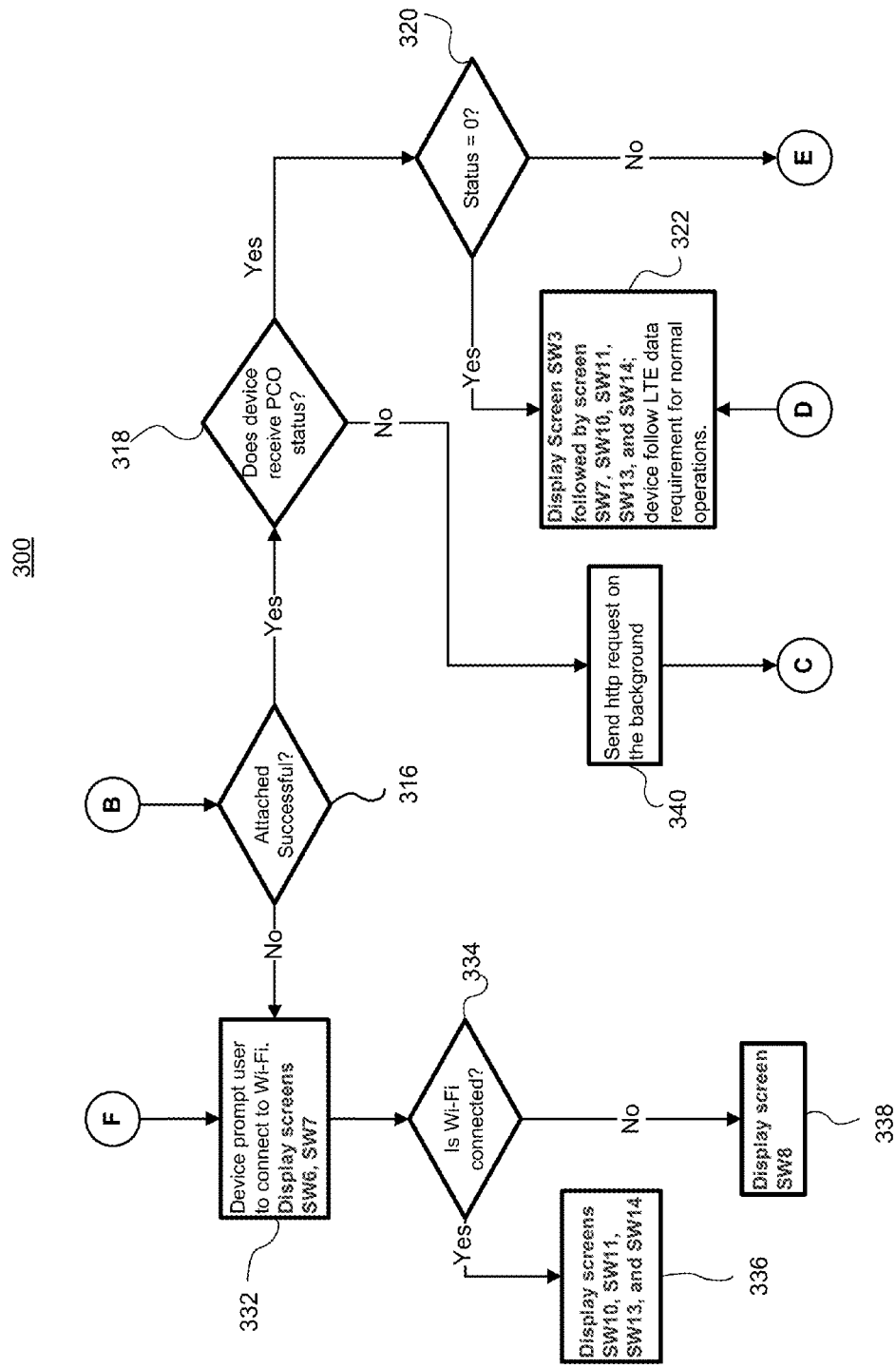
FIG. 3B is a flowchart illustrating the functionality of a method according to a particular embodiment.
Figure 3C:
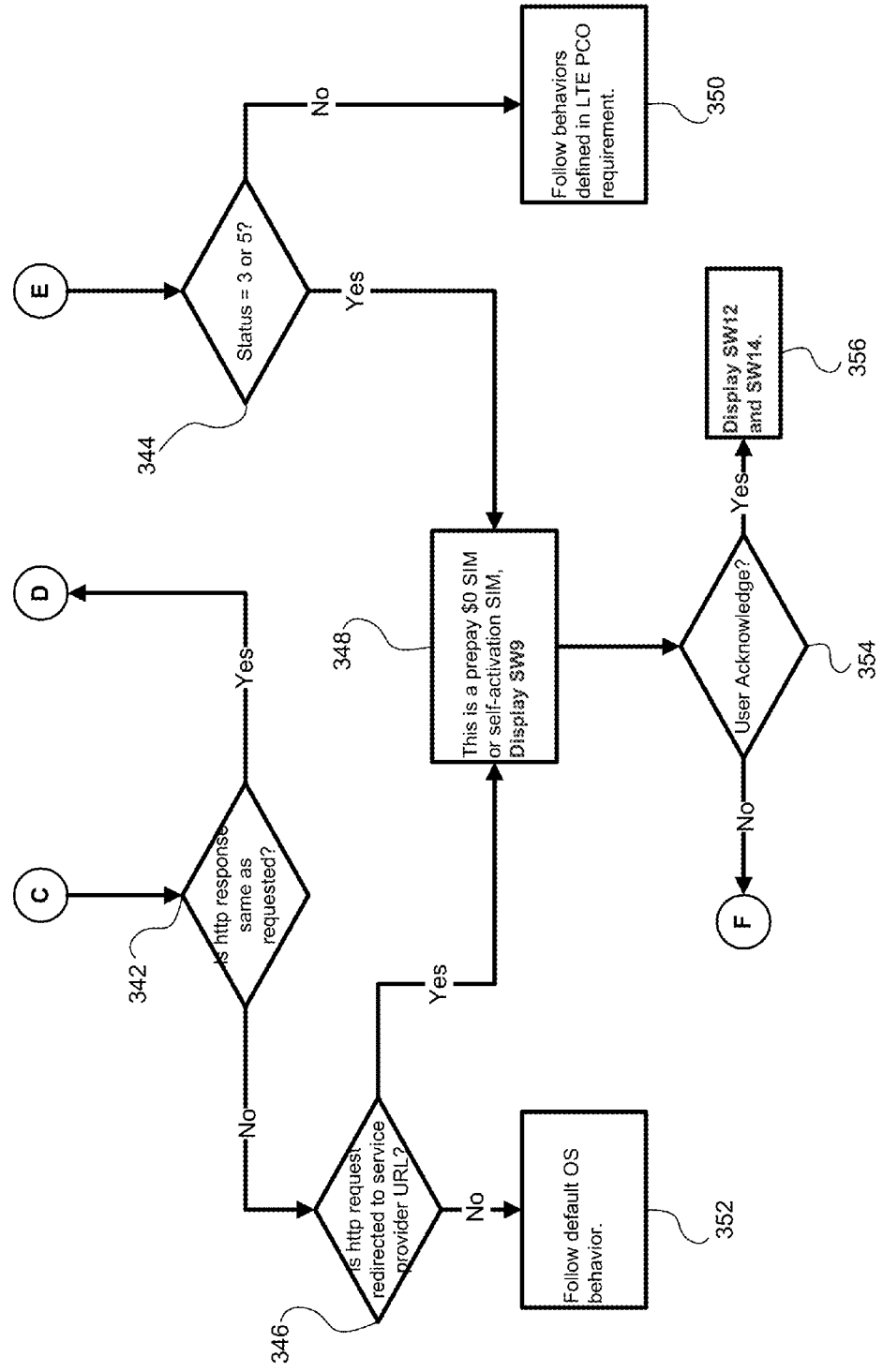
FIG. 3C is a flowchart illustrating the functionality of a method according to a particular embodiment.

FIGS. 3A-3C is a flowchart illustrating the functionality for providing a setup wizard for a user device based on the one or more network codes. This exemplary method 300 may be provided by way of example, as there are a variety of ways to carry out the method. The method 300 shown in FIG. 3 can be executed or otherwise performed by one or a combination of various systems. The method 300 is described below may be carried out by the systems and networks shown in FIGS. 1 and 2, by way of example, and various elements of the systems and networks are referenced in explaining the example method of FIG. 3. Each block shown in FIG. 3 represents one or more processes, methods or subroutines carried out in exemplary method 300. Referring to FIG. 3, exemplary method 300 may begin at block 302.

Figure 4A:
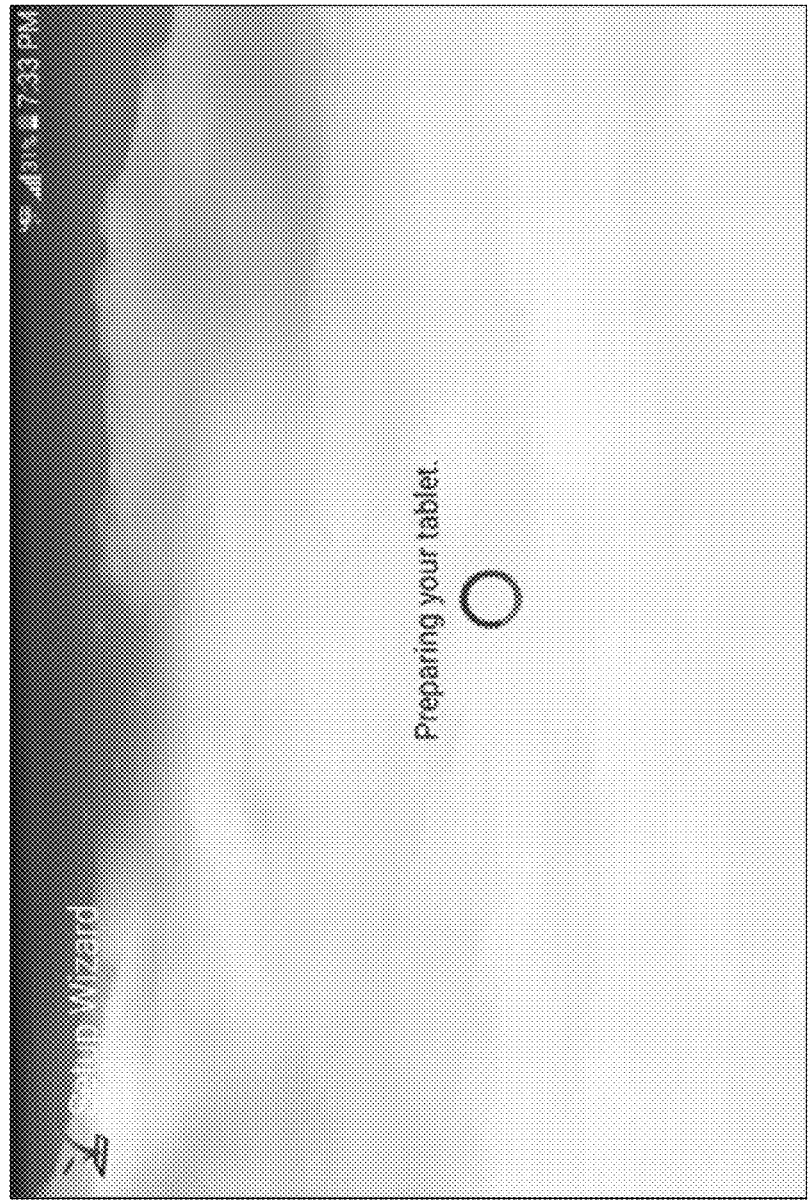
FIG. 4A is a screenshot of a setup screen according to a particular embodiment.

At block 302, user device 102 may be initially powered up. This may be the first time user device 102 has been powered up by the customer. For example, the user of user device 102 may have just purchased user device 102 from a store operated by service provider 112 (or a third party), and has powered up user device 102 for the first time either at the store or remotely. Upon initial activation, user interface module 202 may display screen SW1 on the display of user device 102. An exemplary embodiment of screen SW1 is shown in FIG. 4A. As shown in FIG. 4A, screen SW1 informs the user that user device 102 is being prepared. All of the screens shown in FIGS. 4A-4N may include the current battery power of user device 102, the current date and time, the availability of any networks (such as data network 104 and/or network 106), and other relevant information. Method 300 may proceed to block 304.

Figure 4B:
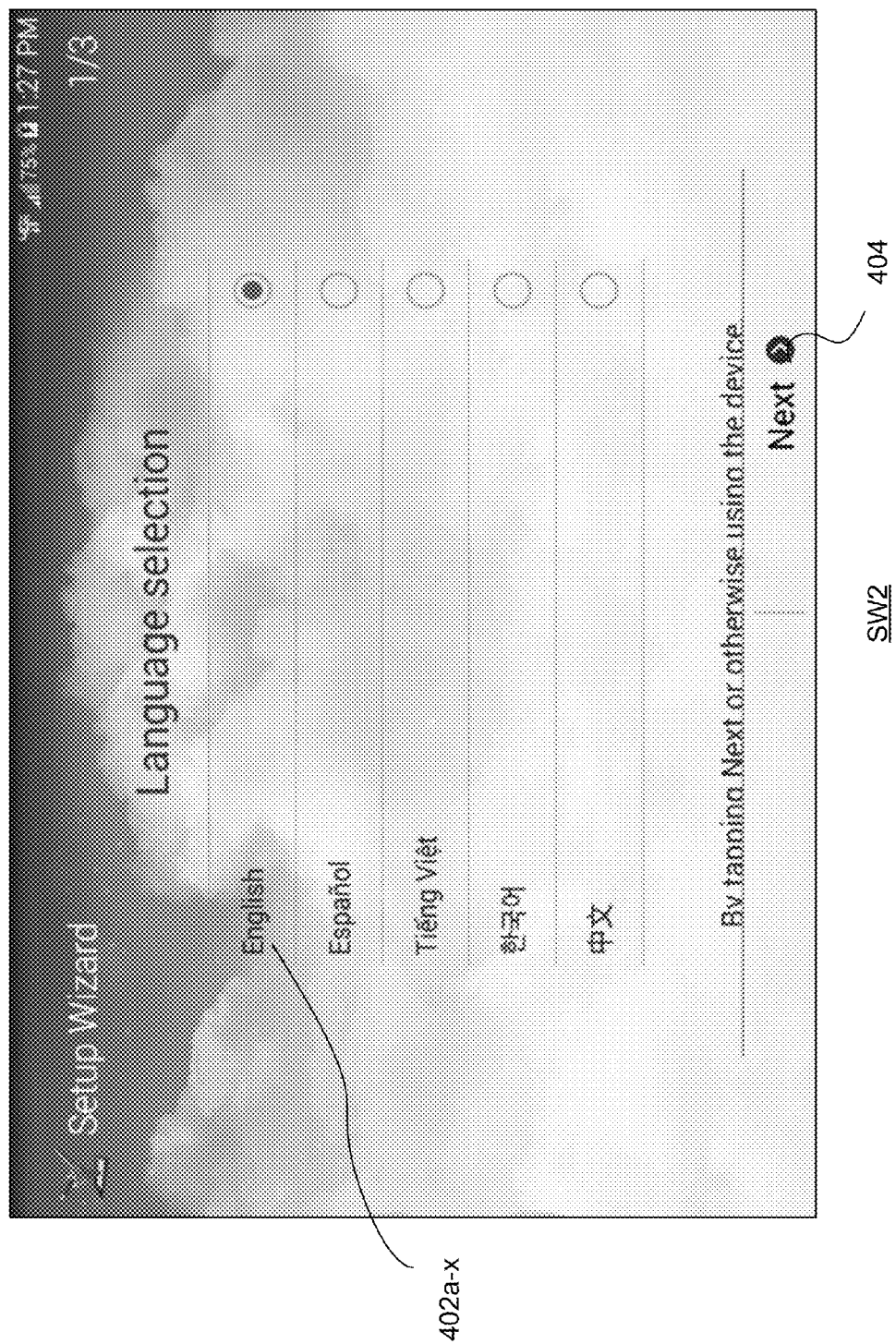
FIG. 4B is a screenshot of a setup screen according to a particular embodiment.
Figure 4C:
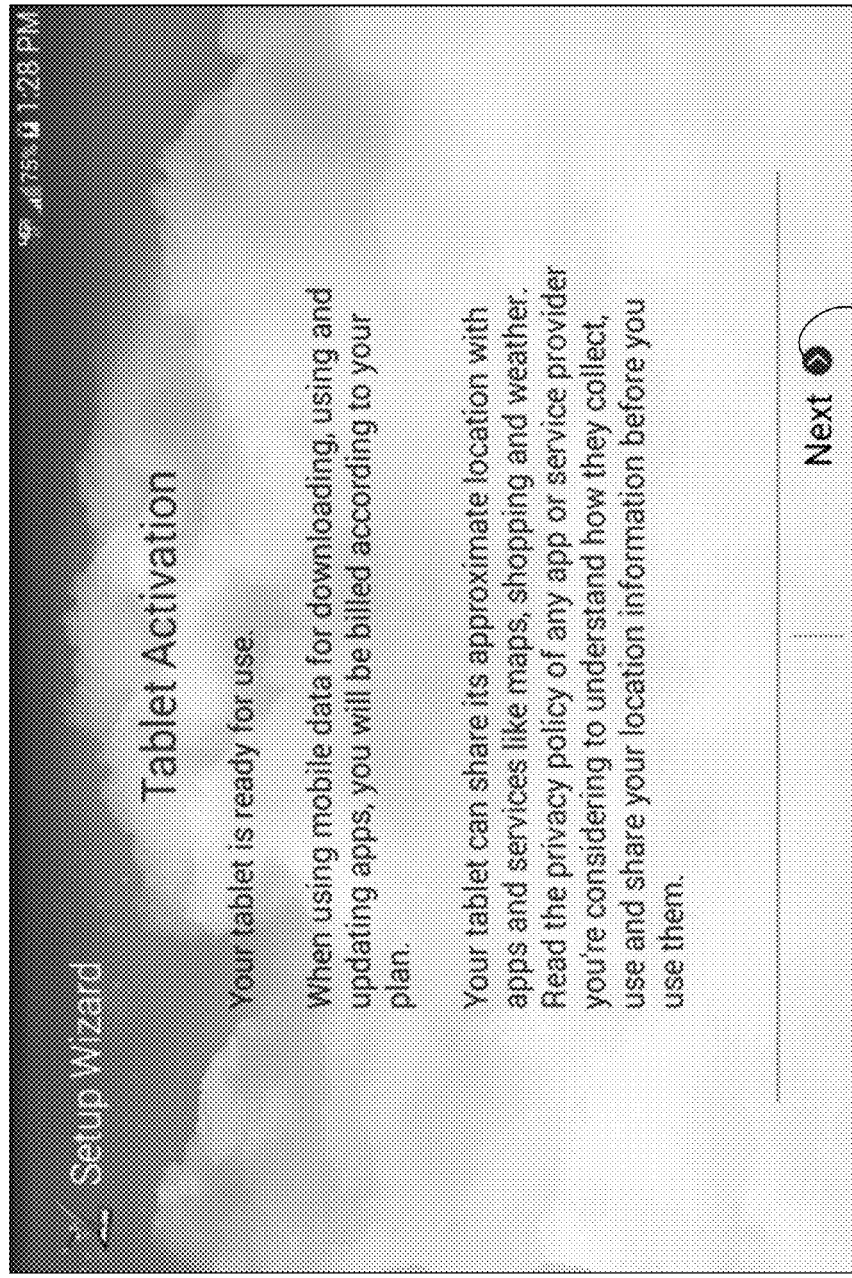
FIG. 4C is a screenshot of a setup screen according to a particular embodiment.
Figure 4D:
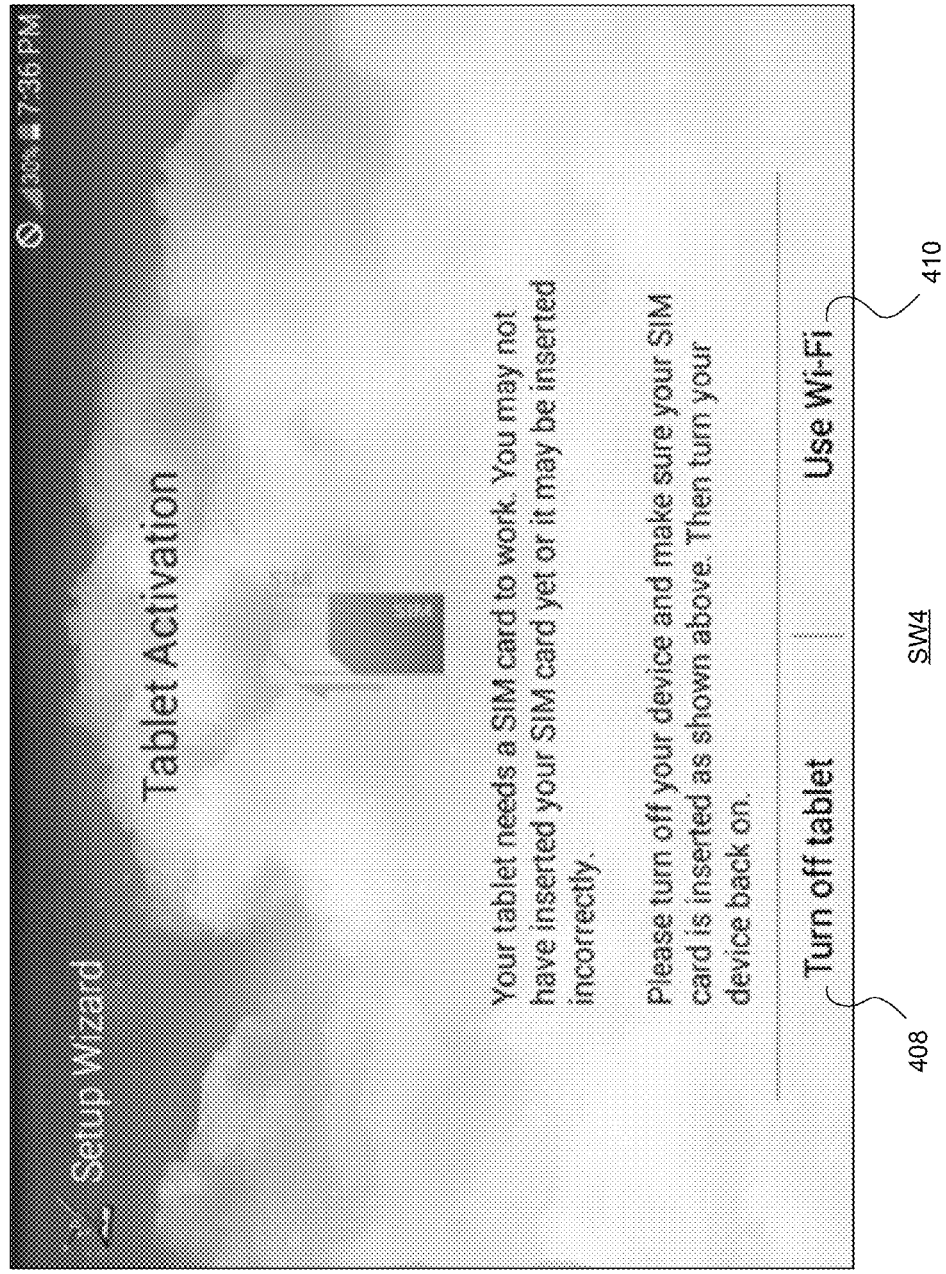
FIG. 4D is a screenshot of a setup screen according to a particular embodiment.

At block 304, hardware module 208 may determine whether user device 102 has a SIM card. If hardware module 208 determines that user device 102 has a SIM card 102a, method 300 may proceed to block 306. If hardware module 208 determines that user device 102 does not have a SIM card, method 300 may proceed to block 310. At block 310, user interface module 202 may display setup screen SW4 on user device 102. An embodiment of setup screen SW4 is shown in FIG. 4D. As shown in FIG. 4D, screen SW4 informs the user that user device 102 does not have a SIM card, or that the SIM card is not correctly inserted or installed. If user device 102 does not have a SIM card, it will not be able to access data network 104. Screen SW4 may include instructions for turning off user device 102 and properly inserting the SIM card. The user may have the option of turning off user device 102 by selecting option 408 (labeled "Turn off tablet"). The user may have the option of connecting to a wireless network, such as network 106, using option 410 (labeled "Use Wi-Fi"). If the user selects option 408, method 300 ends. If the user selects option 410, method 300 may proceed to block 332.

At block 306, network module 206 may determine whether user device 102 is roaming. Data network 104 may include a mobile country code (MCC) and a mobile network operator code (MNO), which may be defined by service provider 112. These codes may be stored with one or more components of data network 104, including PGW 108, HSS 110, and/or other components that are not shown in FIG. 1. SIM card 102a may include a list of MNOs and MCCs that serve as the "home network" for user device 102a. This list may have been programmed into SIM card 102a prior to purchase (e.g., by the manufacturer and/or service provider associated with SIM card 102a). User device 102a may receive the MCC and/or MNO from data network 104. If the MCC and/or MNO for data network 104 do not match any of those in the "home network" list of SIM card 102a, then network module 206 may determine that user device 102 is roaming. If network module 206 determines that user device 102 is roaming, method 300 may proceed to block 308. At block 308, user interface module 202 may display one or more screens associated with roaming requirements for the wireless operator of data network 104. In some embodiments, the screen of user device 102 may include a letter "R" or a delta signal to indicate that user device 102 is roaming. If network module 206 determines that user device 102 is not roaming, method 300 may proceed to block 312.

At block 312, network module 206 may determine whether data network 104 is one of an LTE (4G) network or an eHRPD network. Network module 206 may send and receive one or more signals to data network 104 via modem 102b. The signals may include, for example, the IMEI, the SIM ID (IccID), the PDN connectivity request, and/or a network attach request. User device 102 may receive network identification signals back from data network 104, and provide them to network module 206. These signals may be based on wireless industry standards, wherein each type of network has a unique signal associated with it. User device 102 may have been previously programmed to recognize different network identification signals and associate them with different types of networks. If user device 102 determines that data network 104 is one of an LTE or eHRPD network, method 300 may proceed to block 314. Otherwise, method 300 may proceed to block 324.

At block 324, hardware module 208 may determine whether user device 102 is only equipped to operate with an LTE network. If user device 102 is only equipped to work with an LTE network, user interface module 202 may display a screen that reads "No Service,", and implement one or more default rules for the operating system (OS) for user device 102. These default rules may govern the screens displayed by user device 102 and may inform the user that no LTE network is nearby and that user device 102 is unable to connect to a data network as a result. The default rules may then dictate that method 300 proceed to block 332 (which starts the process of connecting user device 102 to a wireless network, such as network 106). If user device 102 is equipped to connect to more than just an LTE network (e.g., HRPD network, 1× network), method 300 may proceed to block 326.

Figure 4E:
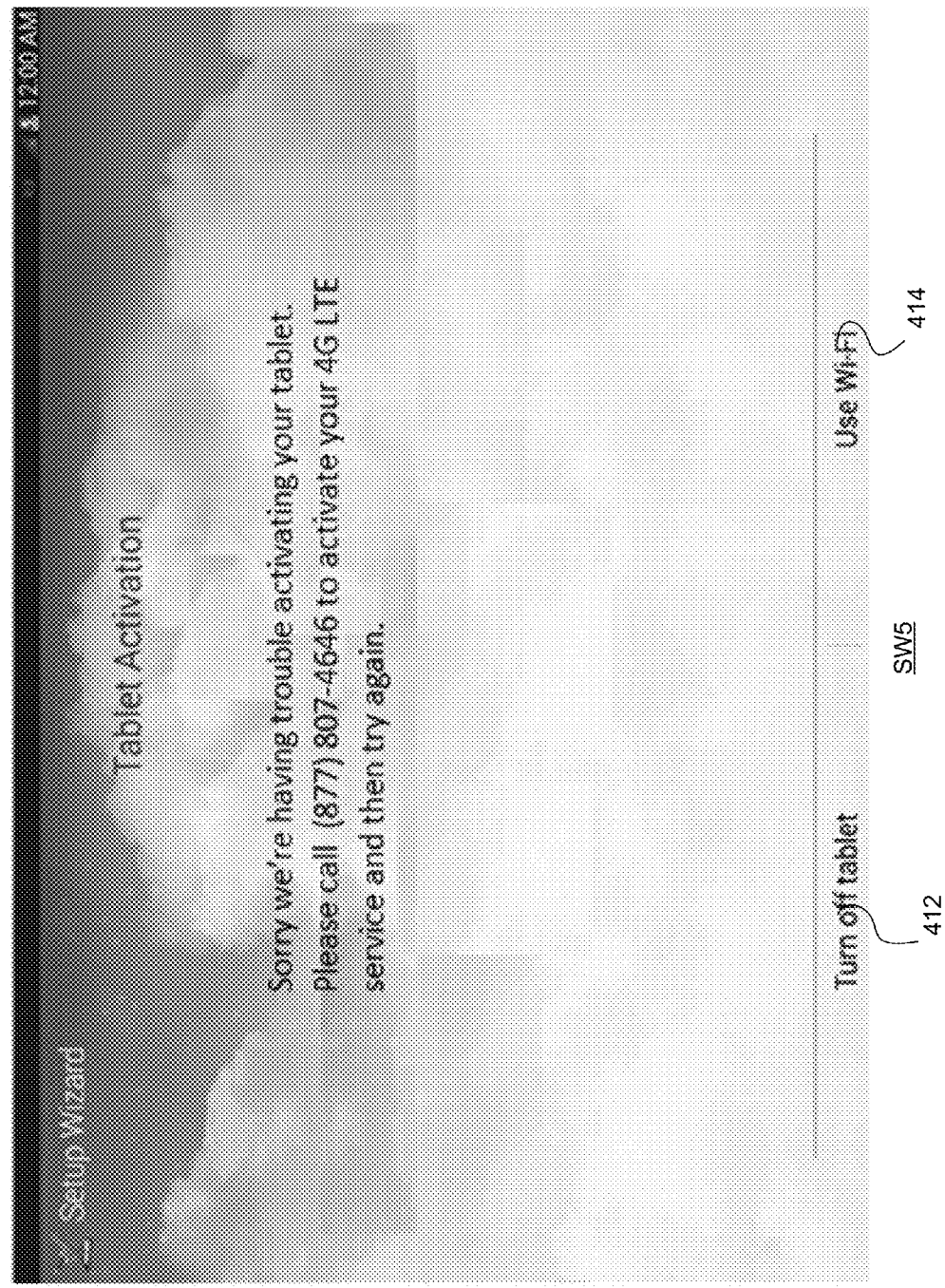
FIG. 4E is a screenshot of a setup screen according to a particular embodiment.

At block 326, network module 206 may attempt to connect to data network 104 using modem 102b. If network module 206 successfully connects to data network 104, method 300 may proceed to block 328. At block 328, user device 102 may follow data requirements for normal operations on an HRPD or 1× data network. If network module 206 cannot successfully connect to data network 104, method 300 may proceed to block 330. At block 330, user interface module 202 may display setup screen SW5. An embodiment of setup screen SW5 is shown in FIG. 4E. Setup screen SW5 may inform the user that the activation of the account associated with SIM card 102a has failed. Setup screen SW5 may include one or more selectable options. The user may select option 412 to turn off user device 102, ending method 300. The user may select option 414 (labeled "Use Wi-Fi"). If the user selects option 414, method 300 may proceed to block 332 (in FIG. 3B). The user of user device 102 may decide whether to call a customer service hotline associated with service provider 112, access a website for service provider 112, or take user device 102 to a physical store operated by service provider 112 in order to determine why SIM card 102a cannot connect to data network 104.

At block 314, network module 206 may attempt to attach to data network 104. User interface module 202 may display setup screen SW2 on the display of user device 102. An embodiment of screen SW2 is shown in FIG. 4B. In screen SW2, the user may be prompted to select a language for the remaining setup screens of the setup wizard. Screen SW2 may present a list of languages, and receive one or more selections from the user of user device 102. The selections are shown as 402a . . . x. As shown in FIG. 4B, screen SW2 may list five different language selections. Other embodiments may present the user with more language selections. The user may select a language, and then select the "Next" option 404 in the lower right hand corner of screen SW2 (as shown in FIG. 4B). Method 300 may proceed to block 316, shown in FIG. 3B. The remaining screens may be presented in the language selected by the user in block 314.

Turning to FIG. 3B, at block 316, network module 206 may determine whether user device 102 successfully attached to data network 104. Code module 204 may be configured to interact with modem 102b and network module 206 to attach to data network 104 when user device 102 is initially powered up. Code module 204 may cause modem 102b to send an attach request and a PDN connectivity request to data network 104. The PDN connectivity request may include the IMSI for SIM card 102a.

PGW 108 may receive the PDN connectivity request from user device 102. PGW 108 may determine what type of account is associated with SIM card 102a by sending a request to HSS 110. HSS 110 may maintain a record for service provider 112 of IMSI's that are associated with provisioned accounts for service provider 112 and the type of account. Each IMSI may be associated with a unique account with service provider 112 that allows user device 102 to access data network 104. The account may be a post-pay account, a pre-pay account with a positive account balance, a pre-pay account with a $0 account balance, or a self-activation account. This account information maintained by HSS 110 corresponds to the type of SIM card in user device 102. If HSS 110 determines that the IMSI matches a provisioned account, HSS 110 transmits one or more signal to PGW 108 indicating what type of account is associated with SIM card 102a (e.g., a post-pay account, a pre-pay account with a positive account balance, a pre-pay account with a $0 account balance, or a self-activation account). Upon receiving this information, PGW 108 generates a network code and transmits it to modem 102b of user device 102. PGW 108 may allow user device 102 to register or "attach" to data network 104 via PGW 108 if HSS 110 sends a signal to PGW 108 indicating that SIM card 102a is one of a Hot SIM, Warm SIM, $0 prepay SIM, or SA SIM. In that situation, method 300 proceeds to block 318. If HSS 110 sends a signal to PGW 108 indicating that SIM card 102a is a Cold SIM, the network code generated and transmitted by PGW 108 will be an Evolved Packet System (EPS) Mobility Management (EMM) code and PGW 108 will reject user device 102 and not permit it to attach to data network 104, and method 300 will proceed to block 332.

If user device 102 does not successfully attach to data network 104, modem 102b may receive the EMM code from PGW 108. Code module 204 may receive the EMM code from modem 102b. The EMM cause code may have a value of 8, indicating that SIM card 102a is a Cold SIM (i.e., service provider 108 does not recognize the IMSI of that SIM card). If this is the case, method 300 may proceed to block 332.

At block 318, code module 204 may determine whether it has received a PCO code from modem 102b (which may receive the code from PGW 108). Modem 102b may transmit one or more signals to data network 104 (note, this may occur in the background at any point between blocks 302 through block 318). If user device 102 received a PCO code from data network 104 via PGW 108, method 300 may proceed to block 320. If user device 102 does not receive a PCO code from data network 104 (via PGW 108), method 300 may proceed to block 340.

At block 320, code module 204 may determine whether the received PCO code is 0. As previously stated, in the embodiment shown in FIGS. 3A-3C, if data network 104 returns a PCO code of 0, this indicates that SIM card 102a is one of a Hot SIM or a Warm SIM (meaning the SIM card 102a is associated with an account that is either a post-pay account, or a prepay account with a positive account balance that is greater than $0). In this embodiment, a PCO code of 0 means user device 102a will be granted normal access to data network 104. If the PCO code is 0, method 300 may proceed to block 322. If the PCO code is not 0, method 300 may proceed to block 344. In other embodiments, the PCO code may have a different value corresponding to a Hot SIM or a Warm SIM, and this value may be determined by the components of data network 104 and/or service provider 112.

At block 322, user interface module 202 may display a series of setup screens SW3, then SW7, SW10, SW11, SW13, and SW14. Embodiments of these screens are shown in FIGS. 4C, 4G, 4J, 4K, 4M, and 4N. As shown in FIG. 4C, setup screen SW3 may inform the user that user device 102 is ready for use. Setup screen SW3 may include information describing the type of plan that SIM card 102a is associated with (a post-pay account or a prepay account). Setup screen SW3 may include information informing the user of other features, such as location-based features. User device 102 may be equipped with GPS technology to allow for location tracking of user device 102. Setup screen SW3 may include privacy-related information informing the user of the privacy policies of any application and/or service provider 112. Setup screen SW3 may include one or more interactive buttons 406 that allow the user to move to the next screen. At block 322, once the user selects the "next" option 406 shown on SW3, user interface module 202 may then display setup screen SW7.

Figure 4F:
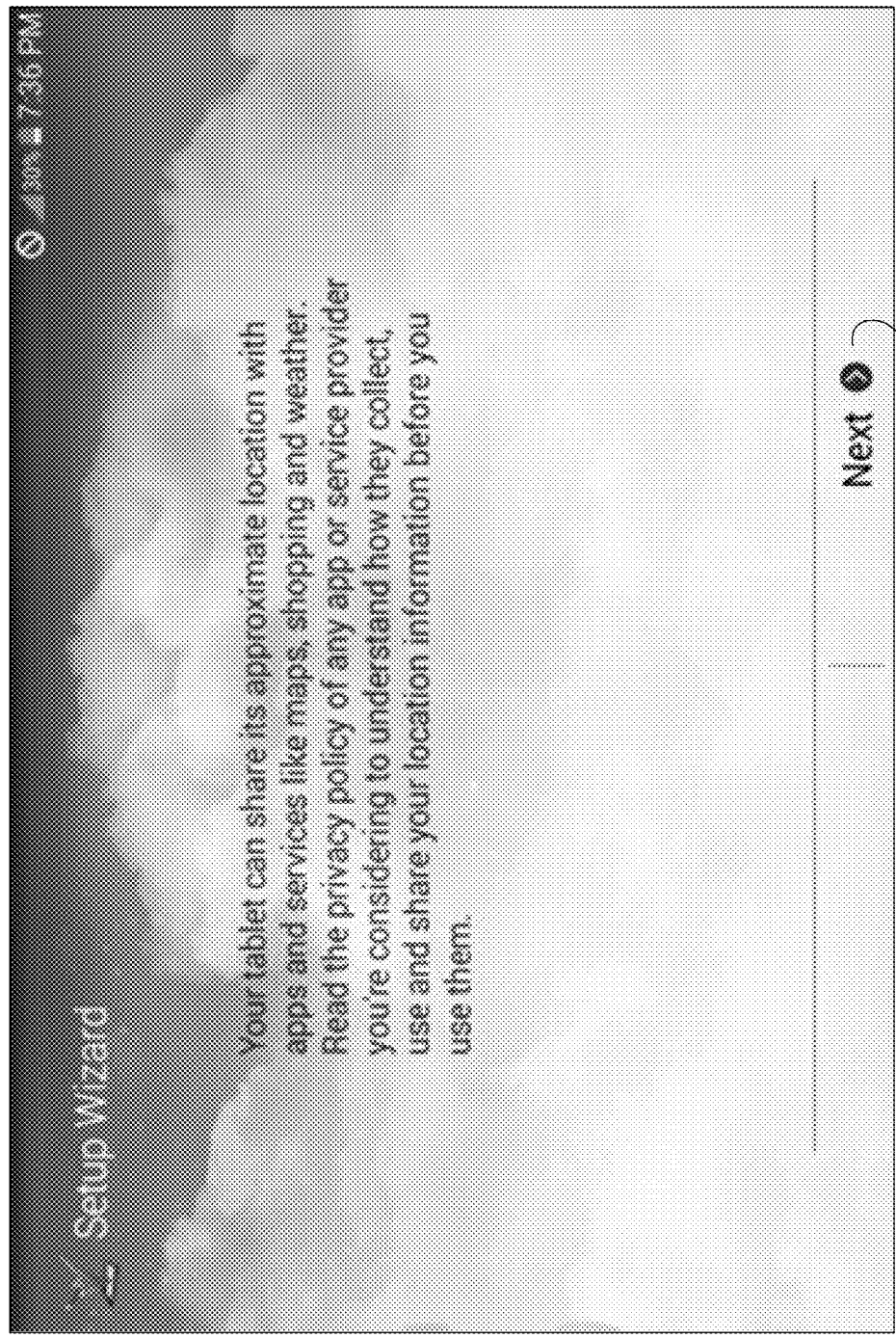
FIG. 4F is a screenshot of a setup screen according to a particular embodiment.
Figure 4G:
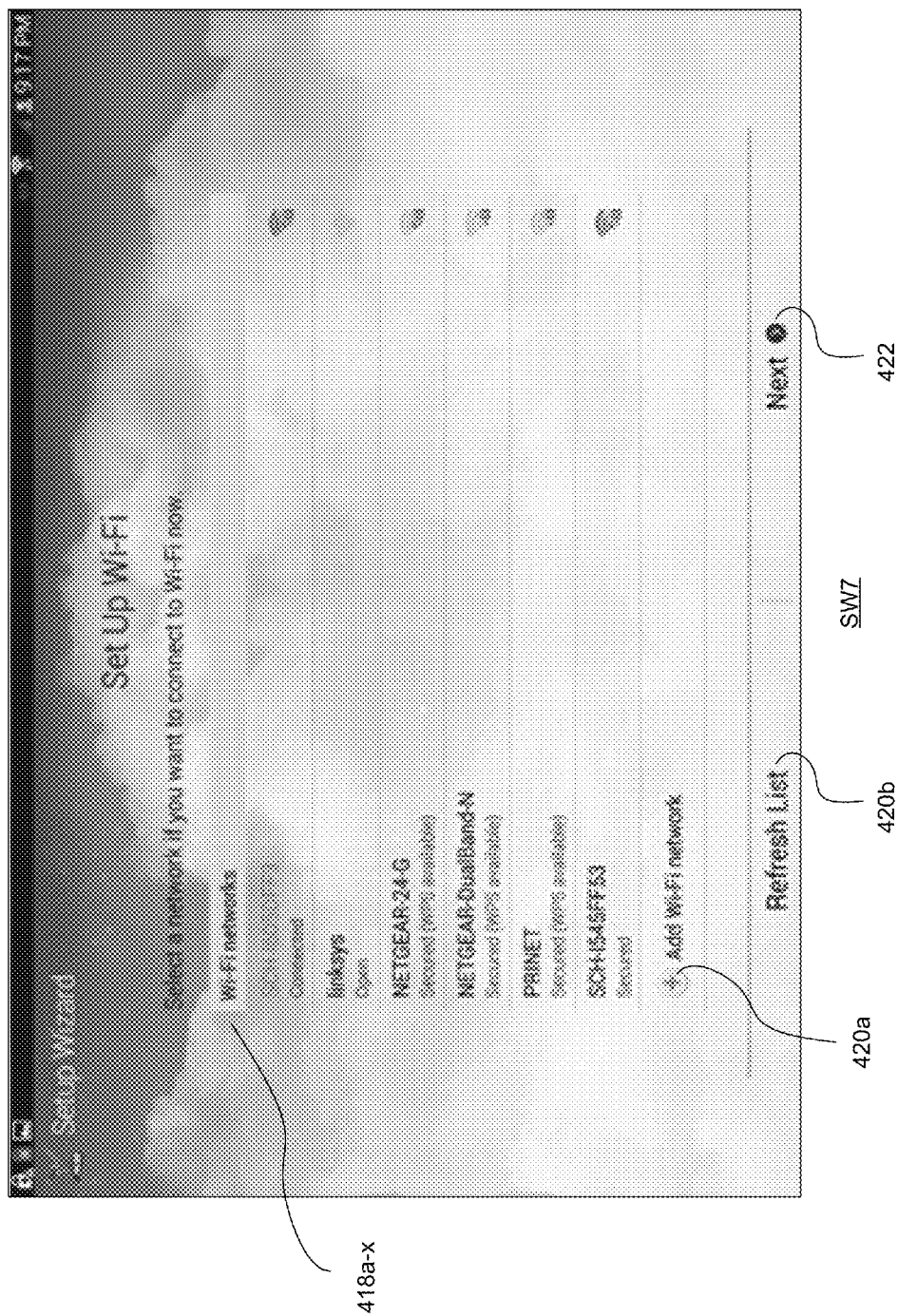
FIG. 4G is a screenshot of a setup screen according to a particular embodiment.

An embodiment of setup screen SW7 is shown in FIG. 4G. As shown in FIG. 4G, setup screen SW7 may list one or more available wireless networks that user device 102 can connect with (shown as options 418*a-x*). The one or more wireless networks may include network 106. The user associated with user device 102 may have previously setup a LAN that connects to network 106, and may have created one or more passwords that must be entered before user device 102 can connect to network 106. The LAN may be shown in the list of available networks in setup screen SW7. The user may select the LAN by selecting the corresponding option from 418*a-x*, and then selecting the "Next" option 422. The user may be prompted to enter the password for the network. The LAN may not be password protected, and the user may select it and be connected to network 106. As shown in SW7, the user may have the option of adding a network to the list of available networks by selecting option 420*a*. The user may refresh the list of available networks by selecting option 420*b*. Once the user has setup a connection to network 106, interface module 202 may display setup screen SW10. A user may choose to skip the step of setting up a wireless network, and may instead simply proceed to screen SW10.

Figure 4H:
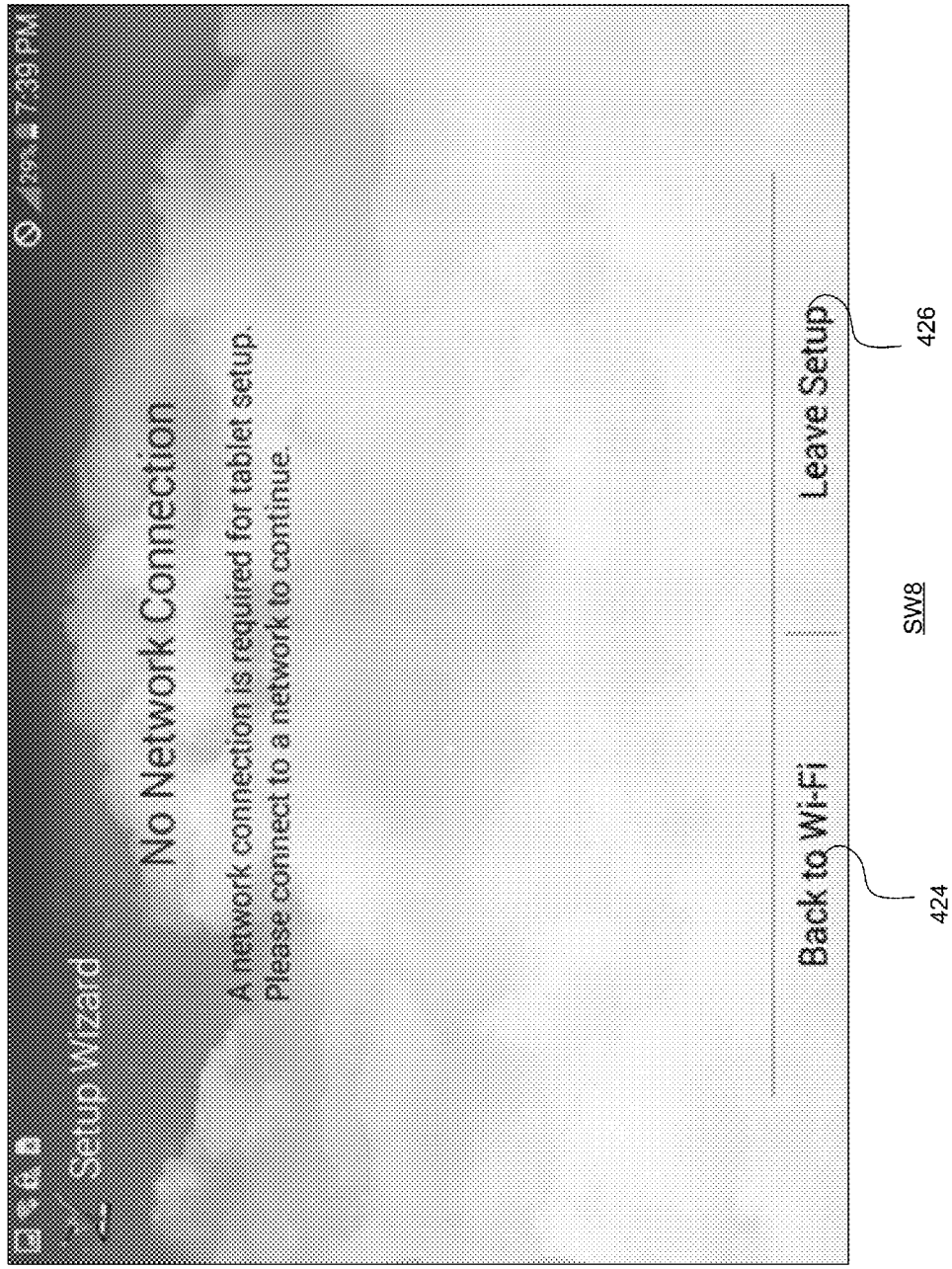
FIG. 4H is a screenshot of a setup screen according to a particular embodiment.
Figure 4I:
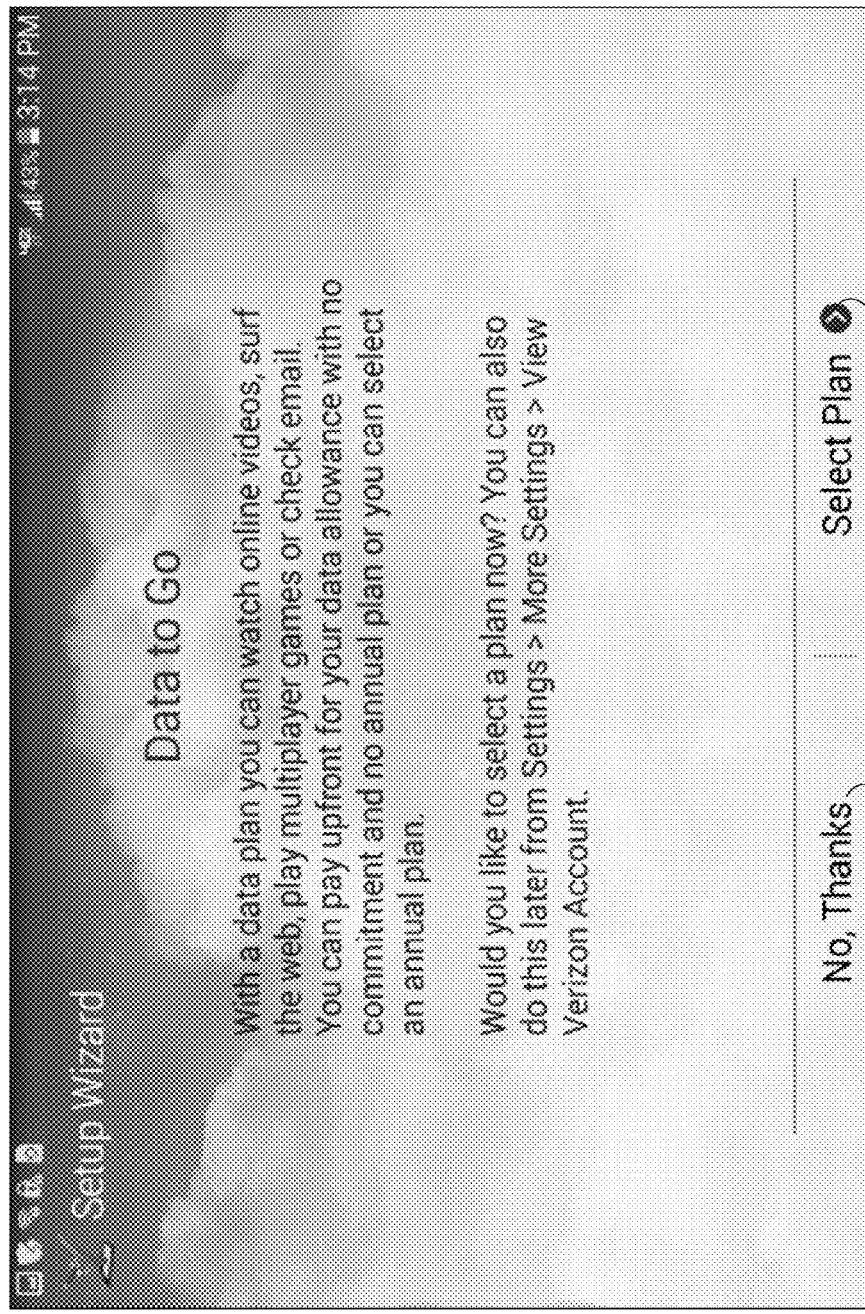
FIG. 4I is a screenshot of a setup screen according to a particular embodiment.
Figure 4J:
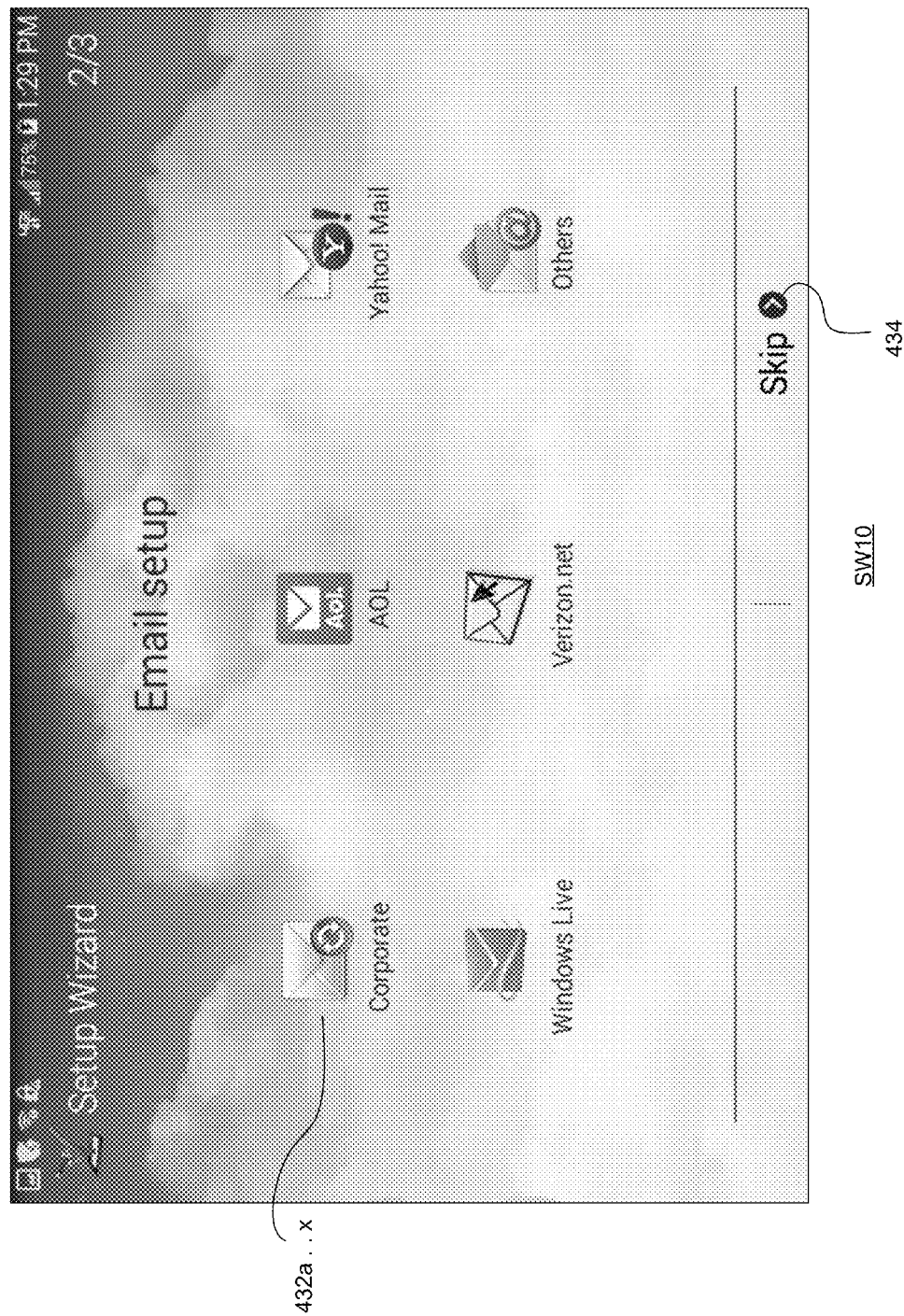
FIG. 4J is a screenshot of a setup screen according to a particular embodiment.

As shown in the exemplary embodiment in FIG. 4J, setup screen SW10 may allow the user to setup one or more email accounts that the user can access using user device 102. In FIG. 4J, setup screen SW10 shows six different email options 432*a* . . . *x*. Other embodiments of setup screen SW10 may show more than six or fewer than six options. When the user selects one or more of the options 432*a* . . . *x*, user device 102 will display one or more screens to allow the user to link user device 102 to an email account.

The user may choose to skip past set up screen SW10 by for example, pressing or selecting the "skip" option 434 shown in the lower right hand corner of set up screen SW10. In other embodiments, set up screens SW3, SW7, and SW10 may be presented in a different order, or not presented at all to the user of user device 102*a*. Once the user has completed email setup, or has selected the "skip" option 434, user interface module 202 may display screen SW11.

Figure 4K:
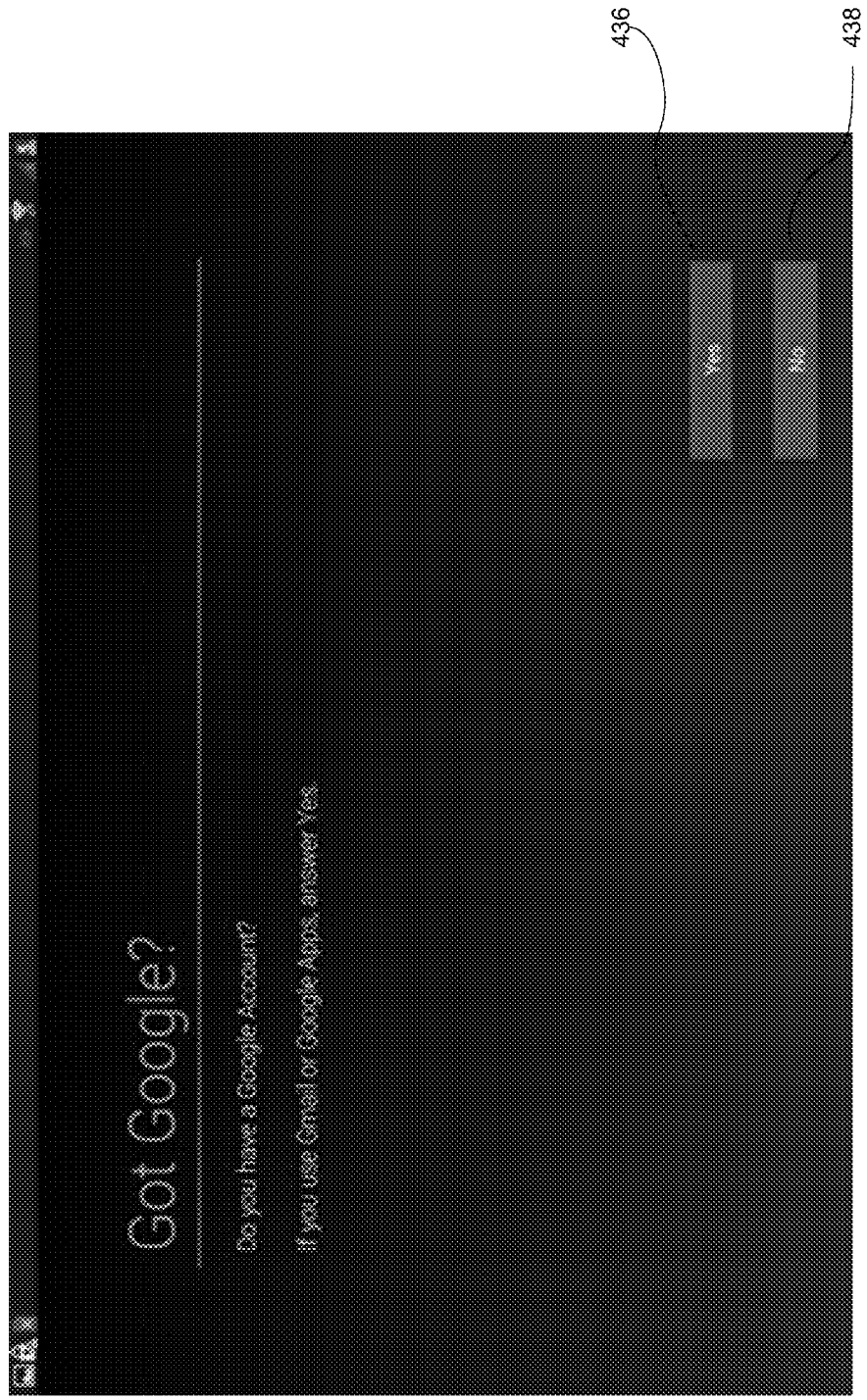
FIG. 4K is a screenshot of a setup screen according to a particular embodiment.

As shown in the exemplary embodiment in FIG. 4K, setup screen SW11 may ask the user whether he or she has one or more Google accounts. The user may have previously created an email account or other account with Google. In other embodiments, setup screen SW11 may ask the user whether he has an account with another third party. Screen SW11 may include interactive portions where the user may select option 436 ("yes") or option 438 ("no"). In other embodiments, setup screen SW11 may be presented before setup screen SW10, or not at all. If the user selects the "yes" option 436, user device 102 may display one or more Google account set up screens for users with an existing Google account (not shown). If the user selects the "no" option, user device 102 may display one or more Google account set up screens for a user to set up a new account (not shown). The screens may also include the option to skip the setup. Once the user has either linked to an existing Google account, setup a new account, or decided not to, user interface module 202 may display screen SW13.

Figure 4L:
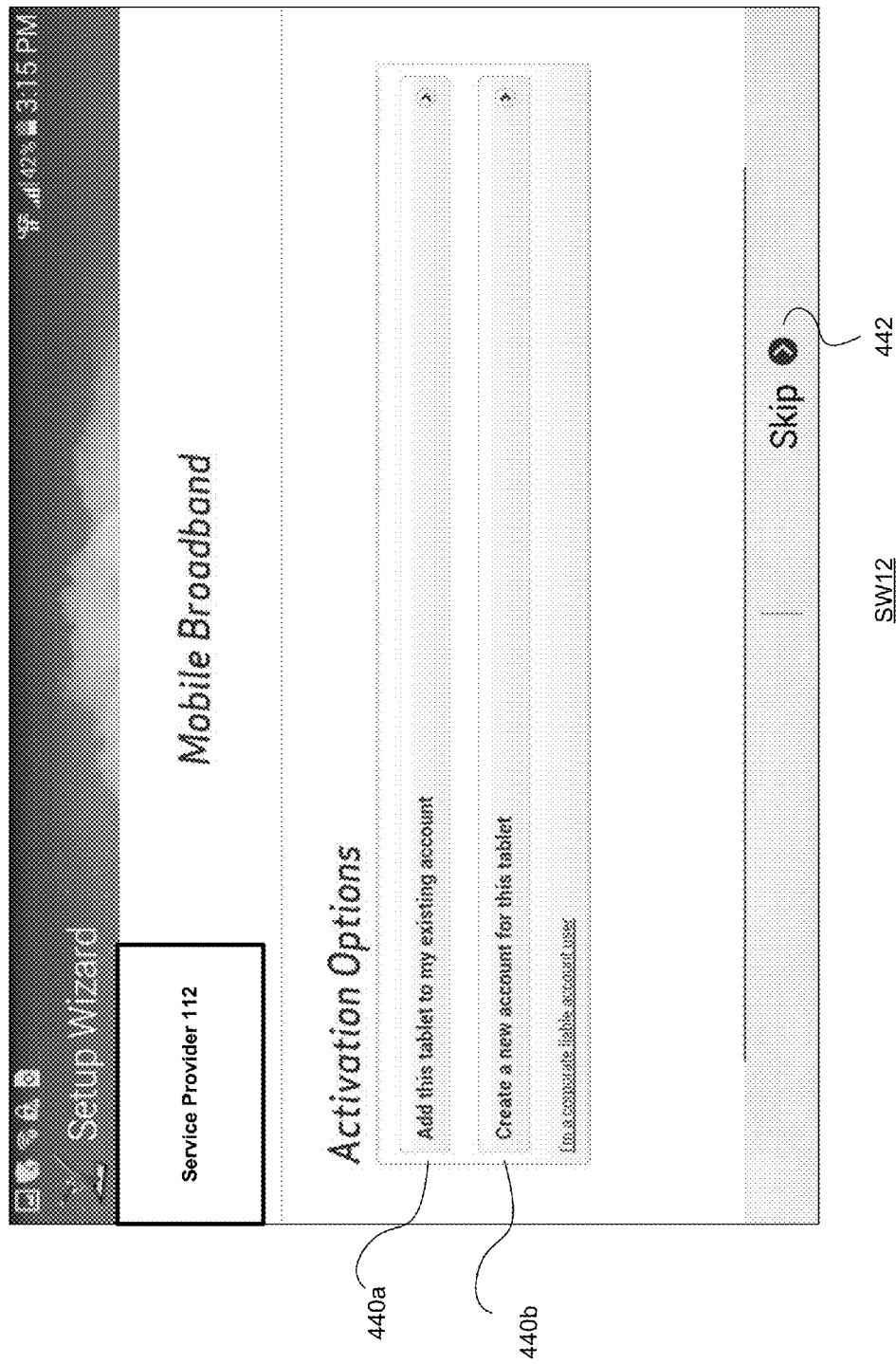
FIG. 4L is a screenshot of a setup screen according to a particular embodiment.
Figure 4M:
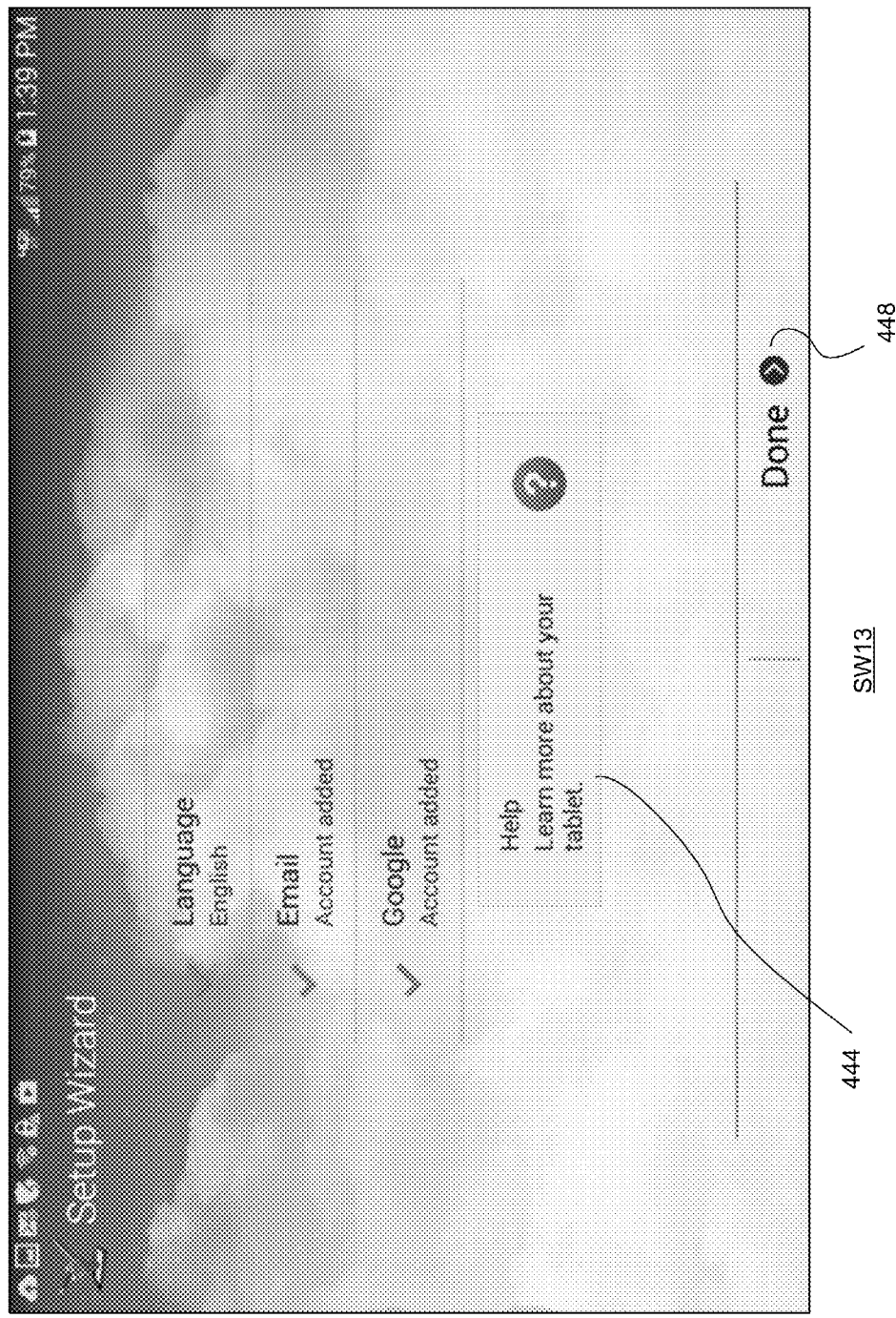
FIG. 4M is a screenshot of a setup screen according to a particular embodiment.
Figure 4N:
FIG. 4N is a screenshot of a home screen according to a particular embodiment.

As shown in the exemplary embodiment in FIG. 4M, setup screen SW13 may provide information to the user summarizing the steps that have been completed on user device 102. The summary may include the language he previously selected (in screen SW2), the email account he setup (in screen SW10), and whether he added a third party account (in screen SW11). If the user did not perform one or more of these steps, screen SW13 may indicate this (for example, by not including a checkmark next to those steps, or by including an "x" mark). The user may have the option to select one of these steps and user interface module 202 may return the user to the appropriate setup screen. Setup screen SW13 may include other options 444, allowing the user to learn more about user device 102. The user may select a "done" option 448, shown in the lower right hand corner of setup screen SW13, at which point user device 102 has completed initial setup. User interface module 202 may display the "home screen" SW14 for user device 102. An embodiment of the home screen is shown in FIG. 4N. This may vary depending on the manufacturer of user device 102, the designer of the operating system, and/or service provider 108. At this point, user device 102 will have unrestricted access to data network 104.

At block 344, code module 204 may determine whether the received PCO code is 3 or 5. As previously stated, a PCO code of 3 may indicate that SIM card 102*a* is a $0 Prepay SIM—meaning SIM card 102*a* is associated with a prepay account with service provider 112 that currently has a balance of $0, and therefore user device 102 will not be given normal access to data network 104 until the account has a positive balance. A PCO code of 5 may indicate that SIM card 102*a* is an SA SIM—meaning SIM card 102*a* does not yet have an active account with service provider 112, and therefore user device 102 will not be given normal access to data network 104 until the account has been activated. If the received PCO code is 3 or 5, method 300 may proceed to block 348. If not, method 300 may proceed to block 350. In other embodiments, the PCO codes may have a different values corresponding to a $0 prepay SIM or an SA SIM, and these values may be determined by the components of data network 104 and/or service provider 112. In this case, the decision in blocks 320 and 344 will depend on those values.

At block 350, user device 102 may follow behaviors defined internally, or by service provider 112. For example, PCO codes of 2 or 4 may have been received by modem 102*b*. User device 102 and/or service provider 112 may have unique requirements for how to handle these PCO codes. As the handling of PCO codes is known to one of skill in the art, this process is not described herein.

At block 348, user interface module 202 may display setup screen SW9. An embodiment of setup screen SW9 is shown in FIG. 4I. Setup screen SW9 may provide the user with information about how to setup an account with service provider 112 so that user device 102 may have access to data network 104. Screen SW9 may include one or more options that the user can select. In FIG. 4I, two selectable options are shown at the bottom of screen SW9. Method 300 may proceed to block 354. At block 354, the user may be prompted to select one of the one or more options. If the user selects option 428 ("No, Thanks"), method 300 may proceed to block 332. If the user selects option 430 ("Select Plan"), method 300 may proceed to block 356.

At block 356, user interface module 202 may display screen SW12. An embodiment of setup screen SW12 is shown in FIG. 4L. Setup screen SW12 may provide the user with one or more options for activating an account with service provider 108 so that user device 102 may access data network 104. The identity of service provider 108 may be shown on screen SW12. In the embodiment shown in SW12, the user may have two options (shown as 440*a* and 440*b*). Other embodiments of SW12 may show more than two options.

If the user selects option 440*a*, user device 102 may be connected to a website portal for service provider 112 via data network 104. The website may allow the user to add user device 102 to an existing account with service provider 112. If SIM card 102*a* is a $0 prepay SIM, the user may have the option to pay for access to data network 104 using the web portal provided by service provider 112. Once the user has paid for the access, user device 102 may be granted access to data network 104 consistent with the plan purchased by the user. If SIM card 102*a* is an SA SIM, the user may have the option of activating his account on the web portal provided by service provider 112 and purchasing a plan to have normal access data network 104. If the user purchases a plan (such as a post-pay account or a prepay account with a positive balance), user device 102 may be granted normal access to data network 104 consistent with the plan. During this process, the user will not be able to access any other websites using data network 104 until the user has activated his account and purchased some type of plan.

If the user selects option 440*b*, user device 102 may be connected to the website portal for service provider 108 via data network 104 to create a new account with service provider 112 so that user device 102 can access data network 104. The steps may be the same as described above, only the user may create a new account that is linked to SIM card 102*a* and gives the user access to data network 104.

If the user instead selects option 442 of SW12, user interface module 202 may display home screen SW14 (an embodiment shown in FIG. 4N), but user device 102 will not have normal access to data network 104 if he did not use one of options 440*a* or 440*b*. Method 300 may proceed to block 332 in one embodiment.

At block 332, user interface module 202 may prompt the user to connect to network 106. User interface module 202 may display screen SW6. An embodiment of setup screen SW6 is shown in FIG. 4F. Setup screen SW6 may include information informing the user of other features, such as location-based features. User device 102 may be equipped with GPS technology to allow for location tracking of user device 102. Setup screen SW6 may include privacy-related information informing the user of the privacy policies of any application and/or service provider 112. Setup screen SW6 may include one or more interactive buttons 416 that allow the user to move to the next screen. If the user selects button 416, user interface module 202 may display screen SW7. An embodiment of setup screen SW7 is shown in FIG. 4G. As shown in FIG. 4G, setup screen SW7 may list one or more available wireless networks that user device 102 can connect with (shown as options 418*a-x*). The one or more wireless networks may include network 106. The user associated with user device 102 may have previously setup a LAN that connects to network 106, and may have created one or more passwords that must be entered before user device 102 can connect to network 106. The LAN may be shown in the list of available networks in setup screen SW7. The user may select the LAN by selecting the corresponding option from 418*a-x*, and then selecting the "Next" option 422. The user may be prompted to enter the password for the network. The LAN may not be password protected, and the user may select it and be connected to network 106. As shown in SW7, the user may have the option of adding a network to the list of available networks by selecting option 420*a*. The user may refresh the list of available networks by selecting option 420*b*. Method 300 may proceed to block 334.

At block 334, network module 206 may determine whether user device 102 is connected to network 106. If user device 102 is connected to network 106, method 300 may proceed to block 336. If user device 102 has not connected to network 106, method 300 may proceed to block 338.

At block 336, user interface module 202 may then display setup screens SW10, SW11, SW13 and/or SW14 (similar to the process in block 322). However, unlike the process in block 322, user device 102 will only have access to network 106, and will not have normal access to data network 104. If no network is available, method 300 may proceed to block 338.

At block 338, user interface module 202 may display setup screen SW8. An embodiment of setup screen SW8 is shown in FIG. 4H. As shown in FIG. 4H, setup screen SW8 may inform the user that no network 106 is available, and that the user must connect to a network in order to continue with the setup process. The user may be able to select one or more options. The user may select the "Back to Wi-Fi" option 424 and user interface module 202 may display setup screen SW7. The user may select the "Leave Setup" option 426 and method 300 may end, or user interface module 202 may display home screen SW14. Note, at this point, user device cannot access either data network 104 or network 106. Setup screen SW8 may include contact information for service providers or third parties that can setup a LAN for user device 102.

At block 340, if code module 204 does not receive a PCO from data network 104, network module 206 may send an http request on data network 104 using modem 102*b*. The http request may be an attempt to connect to a website using data network 104. The website may be specified by network module 206. The website may be a third-party website (e.g., www.google.com). Method 300 may proceed to block 342.

At block 342, modem 102*b* may receive a connection response from data network 104. The connection response may indicate whether modem 102*b* has connected with the website specified in the http request in block 340. If modem 102*b* is able to connect to the third-party website via data network 104, this may indicate that SIM card 102*a* is associated with an activated account (either a post-pay account or a prepay account with a positive balance), and method 300 may proceed to block 322 (described above). If modem 102*b* receives a response from data network 104 that is not the same as the http request, method 300 may proceed to block 346.

At block 346, network module 206 may determine whether modem 102*b* has been redirected to a web portal hosted by service provider 112. If so, this may indicate that SIM card 102*a* is a $0 prepay SIM or a SA SIM, and method 300 may proceed to block 348. If network module 206 determines that modem 102*b* has failed to connect to any website via data network 104, method 300 may proceed to block 352. At block 352, the operating system for user device 102 may follow default behavior (not described herein). This may indicate a problem with user device 102, network 106, and/or data network 104. Method 300 may end.

The various computing devices above (including phones and network equipment), generally include computer-executable instructions, where the instructions may be executable by one or more processors. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system, comprising:
   a mobile device comprising:
      a memory storing instructions; and
      a processor to execute one or more of the instructions to:
         transmit a signal to a network device of a network,
            the signal including information identifying a hardware component included in the mobile device,
            the information identifying the hardware component including information identifying a type of a Subscriber Identity Module (SIM) card included in the mobile device, and the network being associated with a service provider;
         receive a response signal from the network device,
            the response signal comprising a network code,
            the network code being based on the information identifying the type of the SIM card,
            the network code indicating whether the mobile device is allowed to access the network, and
            the network code having a particular value,
            the particular value being a first value when the network code is a Protocol Configuration Option (PCO) code and a type of account, associated with the mobile device, is one of a post-pay account or a pre-pay account with a positive account balance,
            the particular value being a second value when the network code is a PCO code and the type of account, associated with the mobile device, is a pre-pay account having no account balance,
            the particular value being a third value when the network code is a PCO code and the type of account, associated with the mobile device, is a self-activation account, and
            the particular value being a fourth value when the network code is an Evolved Packet System Mobility Management (EMM) code and no account is associated with the mobile device,
            the first value, the second value, the third value, and the fourth value being different values;
         provide, for display, an interactive activation screen based on the network code,
            the interactive activation screen being:
               a first interactive activation screen, configured to allow the mobile device to have unrestricted access to the network, when the network code is the PCO code having the first value,
               a second interactive activation screen configured to allow the mobile device to connect to a web portal, hosted by the service provider, via which a user of the mobile device activates the account, when the network code is the PCO code having the second value or the third value, and a third interactive activation screen, configured to allow the mobile device to connect to a wireless network, when the network code is the EMM code having the fourth value;

receive one or more user inputs for at least one of the first interactive activation screen or the second interactive activation screen; and access the network based on the one or more user inputs.

2. The system of claim 1, wherein the SIM card is associated with the type of account that is one of the post-pay account with the service provider, the pre-pay account with the positive account balance with the service provider, the pre-pay account with no account balance with the service provider, or the self-activation account with the service provider.

3. The system of claim 2, wherein the information identifying the hardware component comprises a unique identifier associated with the SIM card.

4. The system of claim 1, wherein the processor is further to:

connect the mobile device to the network based on the network code being a PCO code and having one of the first value, the second value, or the third value, the mobile device not being connected to the network based on the network code being the EMM code and having the fourth value.

5. The system of claim 1, wherein the interactive activation screen is at least one screen configured to:

allow a user, of the mobile device, to set up an email account for the mobile device, allow the user to select a language for the mobile device, or allow the user to connect to another network using the mobile device.

6. The system of claim 1, wherein the processor is further to:

send a web address request based on the network code not being a PCO code;

receive a web address response based on sending the web address request, the mobile device being redirected to the web portal, hosted by the service provider, based on the web address response not being the same as the web address request; and present, for display, the second interactive activation screen based on the mobile device being redirected to the web portal.

7. The system of claim 1, wherein the one or more user inputs are first user inputs; and wherein the processor is further to:

receive second user inputs for the third interactive activation screen; and access the network based on the second user inputs.

8. A method, comprising:

transmitting, by a mobile device, a signal to a network device of a network, the signal including information identifying a hardware component included in the mobile device, the hardware component including a Subscriber Identity Module (SIM) card included in the mobile device, and the network being associated with a service provider;

receiving, by the mobile device, a response signal from the network device, the response signal comprising a network code, the network code being based on the information identifying the hardware component included in the mobile device, the information identifying the hardware component including information identifying a type of the SIM card included in the mobile device, the network code indicating whether the mobile device is allowed to access the network, and the network code having a particular value, the particular value being a first value when the network code is a Protocol Configuration Option (PCO) code and a type of account, associated with the mobile device, is one of a post-pay account or a pre-pay account with a positive account balance, the particular value being a second value when the network code is a PCO code and the type of account, associated with the mobile device, is a pre-pay account having no account balance, the particular value being a third value when the network code is a PCO code and the type of account, associated with the mobile device, is a self-activation account, and the particular value being a fourth value when the network code is an Evolved Packet System (EPS) Mobility Management (EMM) code and no account is associated with the mobile device, the first value, the second value, the third value, and the fourth value being different values;

sending, by the mobile device, a web address request based on the network code not being a PCO code;

receiving, by the mobile device, a web address response based on sending the web address request, the mobile device being redirected to a web portal, hosted by the service provider, based on the web address response not being the same as the web address request;

presenting, for display by the mobile device, an interactive activation screen based on the network code, the interactive activation screen being:

a first interactive activation screen when the network code is the PCO code having the first value, a second interactive activation screen when the network code is the PCO code having the second value or the third value, or a third interactive activation screen when the network code is the EMM code having the fourth value;

receiving, by the mobile device, one or more user inputs for at least one of the first interactive activation screen or the second interactive activation screen; and accessing, by the mobile device, the network based on the one or more user inputs.

9. The method of claim 8, wherein the SIM card is associated with the type of account that is one of the post-pay account with the service provider, the pre-pay account with the positive account balance with the service provider, the pre-pay account with no account balance with the service provider, or the self-activation account with the service provider.

10. The method of claim 9, wherein the information identifying the hardware component comprises a unique identifier associated with the SIM card.

11. The method of claim 8, wherein the first interactive activation screen is configured to give the mobile device unrestricted access to the network, and wherein the second interactive activation screen is configured to connect the mobile device to a web portal, hosted by the service provider,
the web portal enabling a user, of the mobile device, to activate the type of account associated with the SIM card.

12. The method of claim 8,
wherein the third interactive activation screen is configured to connect the mobile device to another network.

13. The method of claim 8, further comprising:
connecting the mobile device to the network based on the network code being a PCO code having one of the first value, the second value, or the third value.

14. The method of claim 8, wherein the interactive activation screen is at least one screen configured to allow a user, of the mobile device, to set up an email account for the mobile device, allow the user to select a language for the mobile device, or allow the user to connect to a second network using the mobile device.

15. The method of claim 8, wherein the third interactive activation screen is configured to allow the mobile device to connect to a wireless network.

16. A non-transitory computer readable medium storing instructions, the instructions comprising:
one or more instructions which, when executed by a mobile device, cause the mobile device to:
transmit a signal to a network device of a network,
the signal including information identifying a hardware component included in the mobile device,
the hardware component including a Subscriber Identity Module (SIM) card included in the mobile device, and
the network being associated with a service provider;
receive a response signal from the network device,
the response signal comprising a network code,
the network code being based on the information identifying the hardware component included in the mobile device,
the information identifying the hardware component including information identifying a type of the SIM card,
the network code indicating whether the mobile device is allowed to access the network, and
the network code having a particular value,
the particular value being a first value when the network code is a Protocol Configuration Option (PCO) code and a type of account, associated with the mobile device, is one of a post-pay account or a pre-pay account with a positive account balance,
the particular value being a second value when the network code is a PCO code and the type of account, associated with the mobile device, is a pre-pay account having no account balance,
the particular value being a third value when the network code is a PCO code and the type of account, associated with the mobile device, is a self-activation account, and
the particular value being a fourth value when the network code is an Evolved Packet System (EPS) Mobility Management (EMM) code and no account is associated with the mobile device,
the first value, the second value, the third value, and the fourth value being different values;
send a web address request based on the network code not being a PCO code;
receive a web address response based on sending the web address request,
the mobile device being redirected to a web portal, hosted by the service provider, based on the web address response not being the same as the web address request,
the web portal enabling a user, of the mobile device, to activate the SIM card;
present, for display, an interactive activation screen based on the network code,
the interactive activation screen being:
a first interactive activation screen when the network code is the PCO code having the first value,
a second interactive activation screen when the network code is the PCO code having the second value or the third value, or
a third interactive activation screen when the network code is the EMM code having the fourth value;
receive one or more user inputs for at least one of the first interactive activation screen or the second interactive activation screen; and
access the network based on the one or more user inputs.

17. The non-transitory computer readable medium of claim 16, wherein the network code is based on a type of account associated with the SIM card.

18. The non-transitory computer readable medium of claim 16, wherein the second interactive activation screen is configured to allow the mobile device to connect to the web portal; via which the user pays for access to the network.

19. The non-transitory computer readable medium of claim 16, wherein the third interactive activation screen is configured to allow the mobile device to connect to a wireless network.

20. The non-transitory computer readable medium of claim 16, wherein the SIM card is associated with the type of account that is one of the post-pay account with the service provider, the pre-pay account with the positive account balance with the service provider, the pre-pay account with no account balance with the service provider, or the self-activation account with the service provider.

* * * * *